United States Patent [19]
Van Dyke et al.

[11] Patent Number: 5,175,856
[45] Date of Patent: Dec. 29, 1992

[54] COMPUTER WITH INTEGRATED HIERARCHICAL REPRESENTATION (IHR) OF PROGRAM WHEREIN IHR FILE IS AVAILABLE FOR DEBUGGING AND OPTIMIZING DURING TARGET EXECUTION

[75] Inventors: Don A. Van Dyke; Timothy J. Cramer, both of Pleasanton; James C. Rasbold, Livermore; Kelly T. O'Hair, Livermore; David M. Cox, Livermore; David A. Seberger, Livermore; Linda J. O'Gara, Livermore; Jon A. Masamitsu, Livermore; Robert E. Strout, II, Livermore; Ashok Chandramouli, Fremont, all of Calif.

[73] Assignee: Supercomputer Systems Limited Partnership, Eau Claire, Wis.

[21] Appl. No.: 572,043

[22] Filed: Aug. 23, 1990

Related U.S. Application Data

[63] Continuation-in-part of Ser. No. 537,466, Jun. 11, 1990.

[51] Int. Cl.⁵ .............................. G06F 15/16
[52] U.S. Cl. ..................... 395/700; 395/800; 364/DIG. 1; 364/281.7; 364/DIG. 2; 364/973
[58] Field of Search .............. 395/700, 800, 500; 364/200 MS File, 900 MS File

[56] References Cited

U.S. PATENT DOCUMENTS

| | | | |
|---|---|---|---|
| 4,667,290 | 3/1987 | Goss et al. | 364/200 |
| 4,734,854 | 3/1988 | Afshar | 364/200 |
| 4,905,138 | 2/1990 | Bourne | 364/200 |

OTHER PUBLICATIONS

Wolf et al. "Portable Compiler Eases Problems of Software Migration," Nov. 1984, pp. 147-153.
Gujral "Retargetable Code Generation for ADA TM Compilers," Dec. 1981, pp. 1-11.

*Primary Examiner*—Thomas C. Lee
*Assistant Examiner*—L. Donaghue
*Attorney, Agent, or Firm*—Patterson & Keough

[57] ABSTRACT

A modular compilation system that utilizes a fully integrated hierarchical representation as a common intermediate representation to compile source code programs written in one or more procedural programming languages into an executable object code file. The structure of the integrated common intermediate representation supports machine-independent optimizations, as well as machine-dependent optimizations, and also supports source-level debugging of the executable object code file. The integrated hierarchical representation (IHR) is language independent and is shared by all of the components of the software development system, including the debugger.

18 Claims, 16 Drawing Sheets

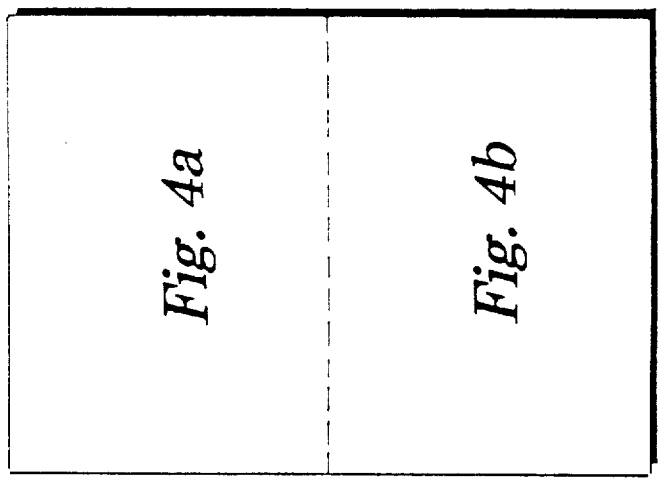

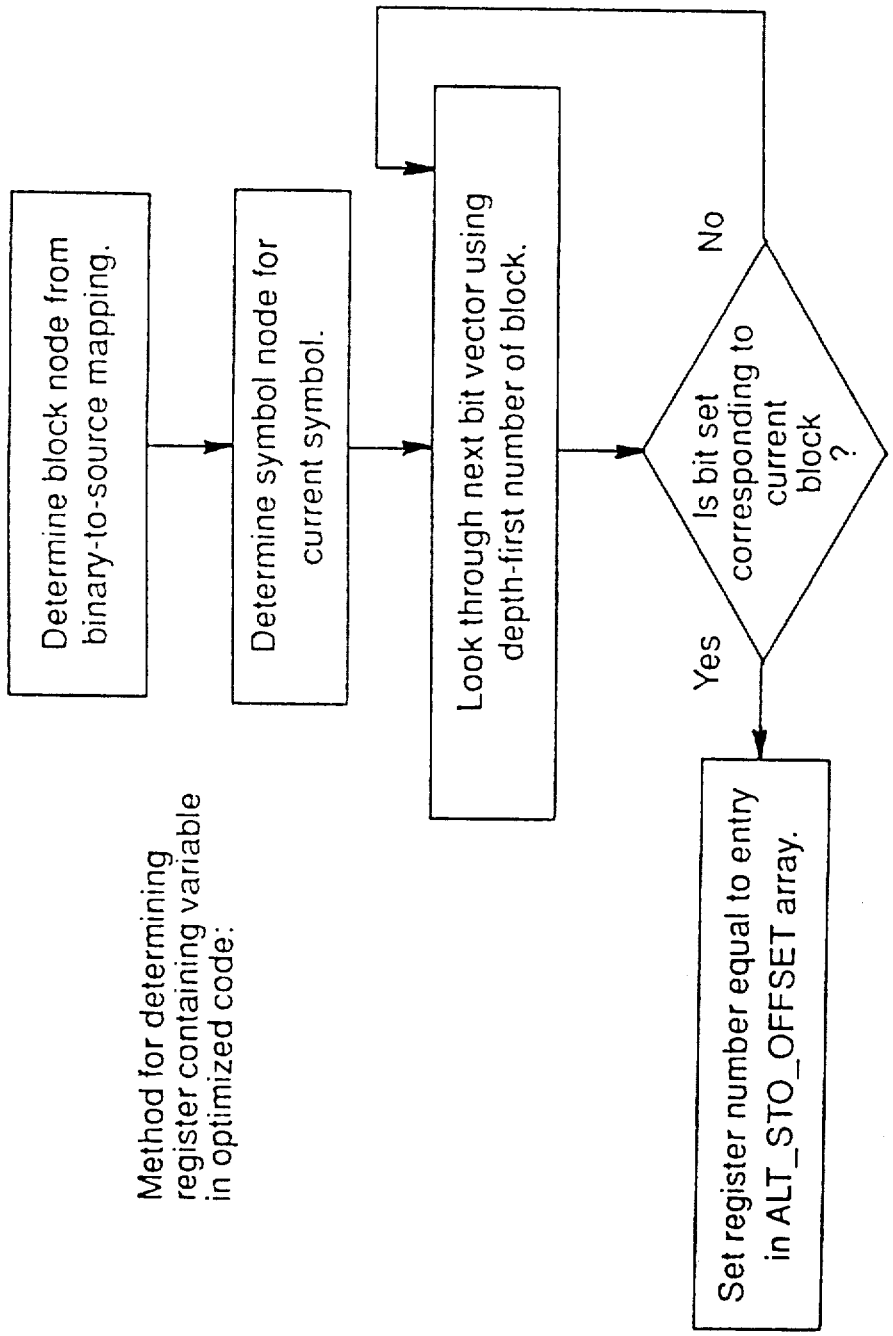

COMPUTER WITH INTEGRATED HIERARCHICAL REPRESENTATION (IHR) OF PROGRAM WHEREIN IHR FILE IS AVAILABLE FOR DEBUGGING AND OPTIMIZING DURING TARGET EXECUTION

RELATED APPLICATION

This application is a continuation-in-part of an application filed in the United States Patent and Trademark Office on Jun. 11, 1990, entitled INTEGRATED SOFTWARE ARCHITECTURE FOR A HIGHLY PARALLEL MULTIPROCESSOR SYSTEM, Ser. No. 07/537,466, which is assigned to the assignee of the present invention and which is hereby incorporated by reference in the present application.

TECHNICAL FIELD

The present invention relates generally to software development of computer programs, and, more specifically, to optimizing compilers for generating object code files from source code programs and debuggers for debugging the object code files as they are executed by a computer processing system, particularly a high-performance multiprocessor system.

BACKGROUND ART

Presently, software development focuses on two separate tasks in the process of generating a computer program: the compiling of the program into an executable object code file to be run on a computer processing system and the debugging of that executable file as it is being executed by the computer processing system. In general, a separate version of a compiler is created for each programming language and each computer processing system. Similarly, a separate debugger is created to debug the executable object code on each computer processing system. As a result of the independent creation of present compilers and debuggers, most prior art software development systems are a collection of separate tools where each of the tools knows little or nothing about the other tools in the development system.

The design and construction of compilers is well known in the art, e.g., Aho, Sethi and Ullman, *Compiler: Principles, Techniques and Tools*, Addison-Wesley (1986); and Waite et al, *Compiler Construction*, Springer-Verlag, (1984). Compilers convert a given computer source language, such as FORTRAN, into code executable by a given computer processing system (i.e., the target machine). Compilation of a computer source language is accomplished through a series of transformations. First, the strings of symbols that comprise the source code are lexically analyzed to ascertain the atomic units or words for translation. Then, the string of symbols are syntactically analyzed for ascertaining the grammatical relations among the words. Typically, the output is expressed in the form of a parse tree which is transformed into an intermediate language representation of the source code. Most compilers do not generate a parse tree explicitly, but form the intermediate code as the syntactic analysis takes place. Optimization is then applied to the intermediate code, after which the target machine-executable or object code is generated. Examples of optimizing compilers for present high performance computer processing systems include the compilers for the Hitachi S-810 supercomputer (e.g., U.S. Pat. Nos. 4,773,007, 4,807,126, 4,821,181, 4,833,606, 4,843,545 and 4,853,872), the compilers for the Cray-1 supercomputer (e.g., Cray Research Publication number SR-0018) and the compilers for the IBM mainframe computers (e.g., U.S. Pat. Nos. 4,782,444, 4,791,558 and 4,802,091).

The design and construction of debuggers is also well known in the art. Debuggers assist programmers in creating executable code by identifying errors in the execution of the object code file and helping to trace the source of the error as manifested in the executable object code file back to the source code program. Most debuggers are particular to a computer processing system because of the inherent relationship between the hardware features of a computer processing system and the execution of object code files on that computer processing system. While the debugging process may be relatively straightforward for a given programming language executing on a given computer processing system, the challenge for present debuggers is to provide effective identification of errors in executable code produced by an optimizing compiler that is, for example, part of a software development system for a high-performance computer processing system. The difficulties of debugging executable code produced by an optimizing compiler are further compounded when the compiler produces code capable of executing on more than one processor in a multiprocessor system.

Optimizations are frequently performed for programs to be executed on a high-performance computer processing system, including multiprocessor systems. The objectives of the optimizing portion of a compilation system are to (a) increase the execution speed of the program, (b) reduce the size of the executable code, and (c) minimize processing costs through efficient resource allocation. Optimizations that are frequently employed in optimizing compilers can be divided into two classes, which are commonly known as "local" and "global" optimizations. Local optimizations are those that are based on an analysis of a relatively small region of the program, such as a "basic block", or perhaps only two adjacent machine instructions. Global optimizations are those that are based on an analysis of more than a single basic block. Examples are "code motion" (moving code out of loops) and "global common subexpression elimination." Although many types of local and global optimizations are presently used in compilation systems, all of these optimization affect the execution of the program in ways that are not obvious from the organization and structure of the source code program and, consequently, increase the problems associated with effectively debugging the program. These problems are further compounded in multiprocessor systems where more than one processor may be executing portions of the executable code file for a given program.

Generally, compilers for different programming languages use different intermediate representations during the compilation process, while debuggers use yet another intermediate representation for the debugging process. Because the debugger has no knowledge of the intermediate representations used by the various compilers, the debugger has no way of relating the optimized executable code back to the original source code and, as a result, the debugging of optimized code is very difficult. Also, for compilers that use different intermediate representations, inter-language inlining is impossible. Because most prior art assemblers do not use a common intermediate representation, assembly language programs must use different debuggers from those used for high level language programs. In addition, little optimization of assembly language programs have been attempted in the past. This is partly because of an assumption that an assembly language program is written exactly the way the programmer wanted it to be written and partly because of the cost of developing an optimizer specifically for assembly language programs.

More recent software development systems such as the Ada Programming Support Environment (APSE) for the Ada programming language use a common intermediate representation (CIR) shared by many of the components in the compilation system in an effort to solve some of the problems mentioned above. Unfortunately, the common intermediate representation, known as DIANA, is specific only to the Ada programming language. Thus, mixing of languages at the intermediate level in the compilation system is impossible. Additionally, DIANA is not in itself capable of representing the transformations performed by optimizers on the source program. For this reason, debugging an optimized program in the Ada environment is difficult. For example, the Ada debugger does not know where to find the value of a variable if the compiler decides to keep that variable in a register, rather than in a memory location. Also, DIANA does not represent machine level instructions, so use of DIANA for assisting in the optimization of assembly language programs is impossible.

Another recent compiler system (U.S. Pat. No. 4,667,290) defines multiple front ends for different programming languages that produce the same common intermediate representation. While this approach solves some of the problems presented by earlier software development systems, several problems still remain. First, the sequential nature of the CIR produced by this prior art software development system fails to represent transformations performed by an optimizer on the source program. Second, the debugger is not closely integrated with the development system. Because of this, the debugger cannot know the kinds of transformations performed by the compiler, hence the debugging of optimized code is difficult. Third, because the assembler in this prior art software development system produces relocatable object code rather than some form of a common intermediate representation, the compiler cannot be used to optimize the assembly language program. Thus, only primitive optimizations such as peephole optimizations can be performed on a machine dependent level, that is to say on the level of code that can only run on a specific target machine. Fourth, because the debugger in this prior art software development system is designed to operate on the CIR generated by the compiler, it is unsuitable for the source-level debugging of assembly language programs. In other prior art systems, this problem is solved by providing primitive debuggers for assembly language programs; however, this requires users to learn two different debuggers, one for high level language debugging and another for assembly language debugging.

Even if a unified and integrated intermediate representation for compilers, assemblers and debuggers were available, the present methods and systems do not represent the information in a form that is most suited for optimization. The various types of common intermediate representations utilized in the prior art software development systems are essentially simple linear representations of information concerning only the actual programming statements in the source code. The common intermediate representations of prior art software development system have no mechanism for preserving important context and optimization information about the compiled program. Most importantly, the actual structure of present common intermediate representations does not allow for efficient optimizations because the structure of the representation does not expose many of the relationships among the components of the source code program.

Although present software development systems can produce efficient and effective executable object code files for a given source code program, there is no completely integrated software development system that allows for common representation of all types of information about the source code and optimized object code program. Consequently, there is a need for an integrated software development system that allows for a common intermediate representation to be effectively utilized by all components of the software development system and that is capable of representing additional information about the program for purposes of optimization and debugging, particularly in a high performance multiprocessor environment. In addition, there is a continuing need to provide better methods and structures for representing this common intermediate representation that are more suitable for performing a variety of optimization techniques during software development.

SUMMARY OF THE INVENTION

The present invention is a modular compilation system that utilizes a fully integrated hierarchial representation (hereinafter referred to as IHR) as a common intermediate representation to compile source code programs written in one or more procedural programming languages into an executable object code file. The structure of the integrated common intermediate representation supports machine-independent optimizations, as well as machine-dependent optimizations, and also supports source-level debugging of the executable object code file. The integrated hierarchical representation (IHR) is language independent and is shared by all of the components of the software development system, including the debugger. For purposes of the present invention, "language independent," means that the IHR can represent a plurality of high-level, procedural computer programming languages as well as specific assembly languages. Because all of the components share the same IHR, any component of the system can understand information about a computer program produced by any other component of the software development system.

Unlike prior art common intermediate representations that only relate to the individual program statements, the IHR of the present invention is capable of representing additional information about the computer program for purposes of optimization and debugging. For example, the compilation system of the current invention includes information about optimizations that have been performed on the IHR. This allows the debugger to provide the user with a much more accurate picture of what the actual optimized code looks like. As of an example of how this additional information is used, consider the situation where the compiler has elected to keep a variable in a register over a particular region of a program. The optimizer will note this information in the IHR so the debugger can find the value of a variable, even when that variable is stored in a register. Without this additional information, the user would have no way of knowing the true value of the variable during execution of that particular region of the program. Another example of the type of additional information stored in the IHR of the present invention is information relating to instruction scheduling. As a result of instruction scheduling optimizations, the compiler may move or reorder instructions related to a source language statement to improve execution speed. The information about the movement of instructions is efficiently represented in the structure of the IHR so that the debugger knows where to set breakpoints in the executable object code file corresponding to the original source language statements.

The IHR of the present invention also enables a new, more efficient means for procedure inlining. Procedure inlining is the process whereby the compiler replaces a procedure call with the actual body of code of the called procedure so that called procedure code executes as part of the program code. When procedure calls are not inlined into program code, the calls are made while the program code executes and can incur significant overhead. The overhead of a procedure call is the cost in time of making a jump to a different section of code and returning from that sectional code and the saving and restoring of registers around these jumps. Inlining saves the overhead of procedure calls being made during the execution of a program. The inlining method of the current invention uses the IHR in a way that presents two significant advantages over inlining methods of the prior art. First, the present invention performs inlining using the IHR to remove restrictions between languages so as to enable inlining between different languages. Second, the present invention performs procedural inlining at two distinct points in the compilation/optimization process so as to ensure full optimization of the program and to inline any procedures called across files.

Another improvement over prior art common intermediate representations is the fact that the present invention allows for both high-level and assembly languages to be represented using the same IHR. As a result, many optimizations performed by the compiler on high level languages can also be performed on assembly language programs. For example, instruction scheduling is not performed by prior art assemblers, but can be performed by the current invention. Source level debugging of assembly language programs is made possible using the same debugger as the high level language debugger. Because the debugger understands the IHR and both the complier and the assembler produce the same IHR, the debugging of both assembly language programs and high-level language programs can be accomplished using a single debugger.

The IHR of the current invention is a hierarchical graphical data structure representation of all types of information relating to a source code program. In its broadest form, the IHR is comprised of a HiForm (HF) representation that is independent of procedural programming language and the target machine and a Lo-Form (LF) representation that is target machine-dependent. Using a hierarchical graphical data structure, the IHR represents the different levels and types of information about the source code program as a related set of nodes, each node graphically representing certain information about the program and having a certain type of relationship with other nodes in the IHR. Generally, three different types of information about the program may be represented in the node structure of the IHR: context information, executable information and optimization information. Because of the various interrelationships among all of these kinds of information, each kind of information may be represented as all or part of one or more nodes. The graphical representation by the IHR of all three types of information as an integrated set of nodes provides an efficient and effective mechanism for implementing a variety of optimization techniques during compilation, particularly optimization techniques that are based upon a graphical analysis of the various relationships within a program (e.g., control flow, dependence analysis, etc.).

At the highest level, a program module is represented as a collection of static program scope nodes. Scope nodes comprise the HF representation of the scope of a program. Each unique scope in a source language program corresponds to one HF scope node. Each scope node contains information about the type of scope, the associated symbol node, the symbol table for the symbols defined in this scope, and the connections to other scope nodes (both sibling scopes and parent and child scopes) which can be used to create a scope graph.

For each scope node there is a related set of symbol nodes and a pragma node. Symbol nodes are the HiForm (HF) representation of named objects. There are symbol nodes for constants, variables, formal parameters, structure components, labels, macros, static data blocks, etc. The symbol nodes for a scope define all of the symbols that may be used within that scope. At this level, the symbol nodes for the variables and statements generally correspond with the actual program variables used in the source code program. The pragma node represents the compiler directives for that scope node and any additional information that may be supplied with those directives (e.g., optimization controls, listing controls, etc.).

Associated with each scope node is a series of statement nodes. Statement nodes comprise the HiForm (HF) representation of statements. Each unstructured source language statement corresponds to one HF statement node, while structured source language statements may correspond to several HF statement nodes. Statement nodes are linked together in lexical order. This facilitates the representation of a basic block by enabling identification of the first and last statement nodes which the basic block contains.

Each statement node will have an associated series of expression nodes. Expression nodes are the representations of expressions in HF. The expressions represent the series of operators (e.g., load, add, multiply) and operands (i.e., variables and constants) that together make up the associated statement. Conceptually, an expression is a representation of some value within the program that is the result of an operation set forth by the associated statement.

Associated with the expression nodes are the literal nodes, type nodes and LF nodes. Literal nodes are the HF representation of objects or operands with compile-time constant values. Types nodes are the HF representation of the data type of an object (e.g., integer, floating point, double precision). At the lowest level associated with each expression, the LF nodes are a representation of the machine instructions generated for the expression. Depending upon the kind of expression, one or more LF nodes will be related to an expression node in a hierarchical tree relationship.

While the actual information related to each node may include one or more of the three general kinds of information about the program (context, execution or optimization). generally context information is represented in the scope nodes and symbol nodes and execution information is represented in the statement and expression nodes. Optimization information is information that is generated by compilation system from an analysis of the context and execution information and is usually stored in three additional node structures: block nodes, DUDe and Darc nodes and loop nodes.

Definition-use information relates a variable's definition to all the uses of the variable that are affected by that definition. Use-definition information relates a variable's use to all the definitions of the variable that affect that use. Definition-definition information relates a variable definition with all definitions of the variable that are made obsolete by that definition. The present invention incorporates definition-use, use-definition and definition-definition information for single and multiple word variables, equivalenced variables, pointers and procedure calls (including all potential side effects) into a single representation (DUDe nodes and DARC nodes) that is an integral part of the dependence analysis done for vectorization and multithreading. Each DUDe node represents a use or a definition of a variable. Two DUDe nodes are connected with a DARC node when a possible data dependence exists.

Another structure which aids optimization is the structure graph. This portion of the IHR represents the static nesting of loops in a high-level language program. The structure graph comprises loop nodes and block nodes. A loop node represents a loop in a high-level language (e.g., DO loop in FORTRAN, for loop in C.). A block node represents basic blocks in a high-level language program. The structure graph is connected in a manner which shows the hierarchy of loops and basic blocks in a program.

The present invention is especially adapted for use with a multiprocessor computer processing system, and, in particular, a highly parallel multiprocessor system having multiple tightly-coupled processors that share a common memory. It will be recognized, however, that the current invention is equally effective on computer systems ranging from a single scalar processor to highly parallel, multiprocessor systems with pipelined vector processing mechanisms.

In the preferred embodiment, the integrated modular compilation system of the present invention is comprised of a set of integrated program development tools including a program manager, a compiler, a user interface, and a distributed debugger. The program manager controls the development environment for source code files representing a software program. The compiler is responsible for compiling the source code file to create an object code file comprised of multiple threads capable of parallel execution. An executable code file is then derived from the object code file. The user interface presents a common visual representation of the status, control and execution options available for monitoring and controlling the execution of the executable code file on the multiprocessor system. The distributed debugger, utilizing IHR, provides debugging information and control of the execution of the executable code file on the multiprocessor system.

An assembler for generating object code from an assembly source code program may automatically perform some optimization of the assembly language program. The assembler generates LF which is translated by the binary generator into object code (machine instructions). The assembler also generates HF for an assembly language program that provides information useful in debugging assembly programs because of the integration between the HF representation of a program and the distributed debugger of the present invention.

The distributed debugger is capable of debugging optimized multithreaded object code for the preferred multiprocessor system. It can also debug distributed programs across an entire computer network, including the multiprocessor system and one or more remote systems networked together with the multiprocessor system. It will be recognized that the optimized parallel object code produced by the compiler will be substantially different than the non-optimized single processor code that a user would normally expect as a result of the compilation of his or her source code. In order to accomplish debugging in this type of environment, the distributed debugger maps the source code file to the optimized parallel object code file of the software program, and vice versa, using the information contained in the IHR of the present invention.

A primary objective of the present invention is to provide an integrated hierarchical representation that is capable of supporting language-independent and machine-independent optimizations, as well as machine-dependent optimizations, and source-level debugging of an optimized executable object code file.

Another primary objective of the present invention is to provide an integrated hierarchical representation that is shared by all of the components of an integrated modular software development system, including the compiler, the debugger, the assembler, the optimizer, and the code generator.

A further primary objective of the present invention is to provide an integrated hierarchical representation that uses a graphical hierarchical data structure to represent context, execution and optimization information associated with a source code program and provides an efficient and effective mechanism for implementing a variety of optimization techniques during software development, particularly optimization techniques that are based upon an analysis of the various relationships within a program.

Still another objective of the present invention is to provide a method for optimizing assembly language programs by using an integrated hierarchical representation and a common optimizer shared by an assembler and compiler.

A still further objective of the present invention is to provide a method for source-level debugging of assembly language programs by using a language-independent integrated hierarchical representation.

An additional objective of the present invention is to provide an integrated modular compilation system especially adapted for generating and debugging source code for a highly parallel multiprocessor system.

Another objective of the present invention is to provide an integrated modular compilation system that can accomplish inter-language inlining and inlining at more than one point during the compilation process.

These and other objectives of the present invention will become apparent with reference to the drawings, the detailed description of the preferred embodiment and the appended claims.

DESCRIPTION OF THE DRAWINGS

FIGS. 5a and 5b show the structure of the debugger register mapping providing information for debugging of optimized code and the method of determining the register containing a variable in optimized code.

DESCRIPTION OF THE PREFERRED EMBODIMENT

Software development systems, including compilers, assemblers and debuggers are well known in the prior art. A working understanding of the concepts and terminology involved in such development systems is assumed for purposes of describing the preferred embodiment of the present invention. For an excellent discussion of the present state of the art of compilation systems, reference is made to Aho, Sethi and Ullman, *Compilers: Principles, Techniques and Tools*, Addison-Wesley (1986).

Although it will be understood that the present invention is capable of operating on any number of computer processing systems, the preferred embodiment of a computer processing system for executing the present invention is a highly parallel multiprocessor cluster system comprising multiple tightly-coupled processors sharing a common memory.

Figure 7:
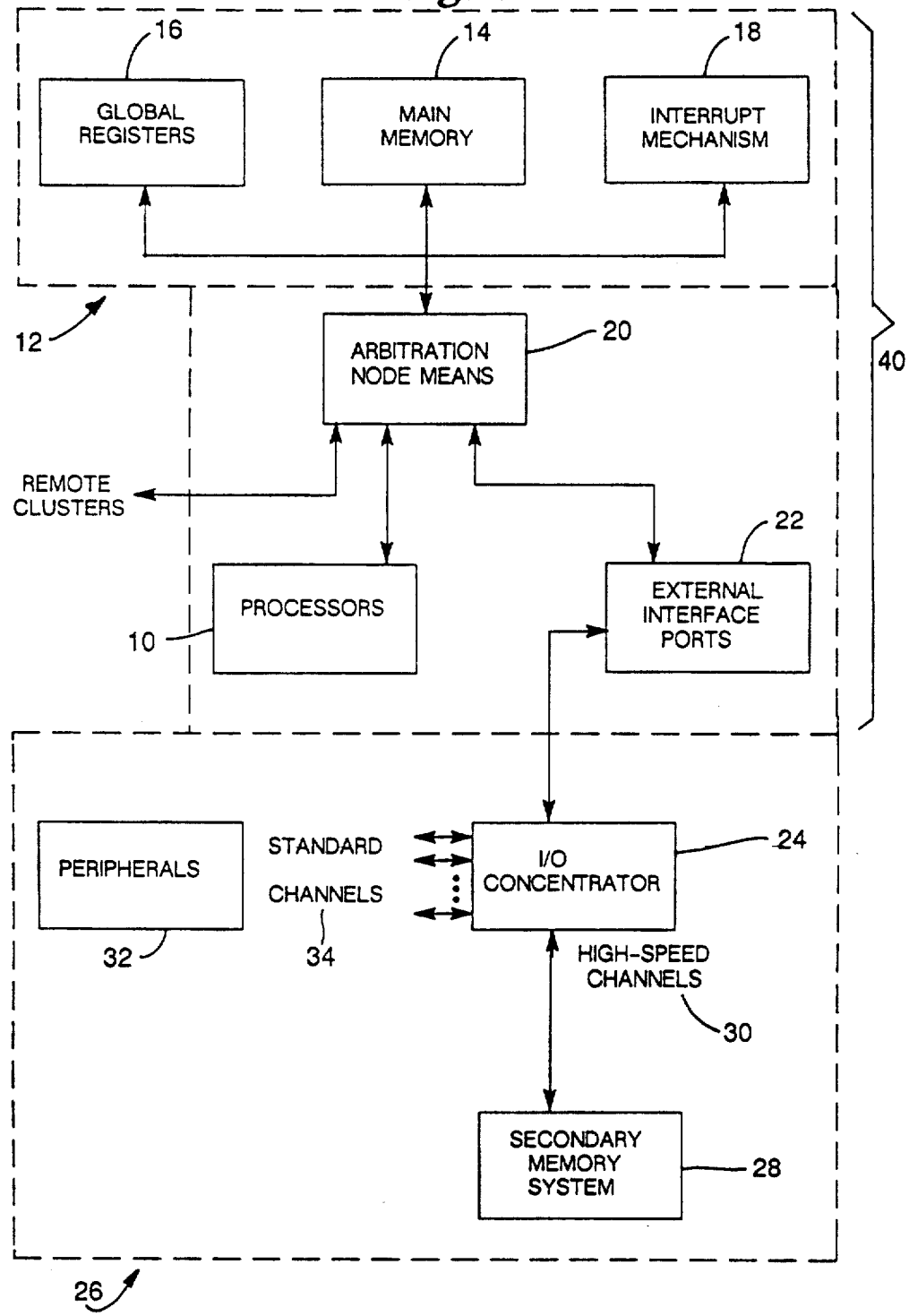
FIG. 7 is a block diagram of the preferred embodiment of a single multiprocessor cluster system for executing the software architecture of the present invention.

Referring now to FIG. 7, a single multiprocessor cluster of the preferred embodiment of the multiprocessor cluster system for executing the present invention is shown having a plurality of high-speed processors 10 sharing a large set of shared resources 12 (e.g., main memory 14, global registers 16, and interrupt mechanisms 18). In this preferred embodiment, the processors 10 are capable of both vector and scalar parallel processing and are connected to the shared resources 12 through an arbitration node means 20. The processors 10 are also connected through the arbitration node means 20 and a plurality of external interface ports 22 and input/output concentrators (IOC) 24 to a variety of external data sources 26. The external data sources 26 may include a secondary memory system (SMS) 28 linked to the input/output concentrator means 24 via one or more high speed channels 30. The external data sources 26 may also include a variety of other peripheral devices and interfaces 32 linked to the input/output concentrator via one or more standard channels 34. The peripheral device and interfaces 32 may include disk storage systems, tape storage systems, terminals and workstations, printers, and communication networks.

Figure 8:
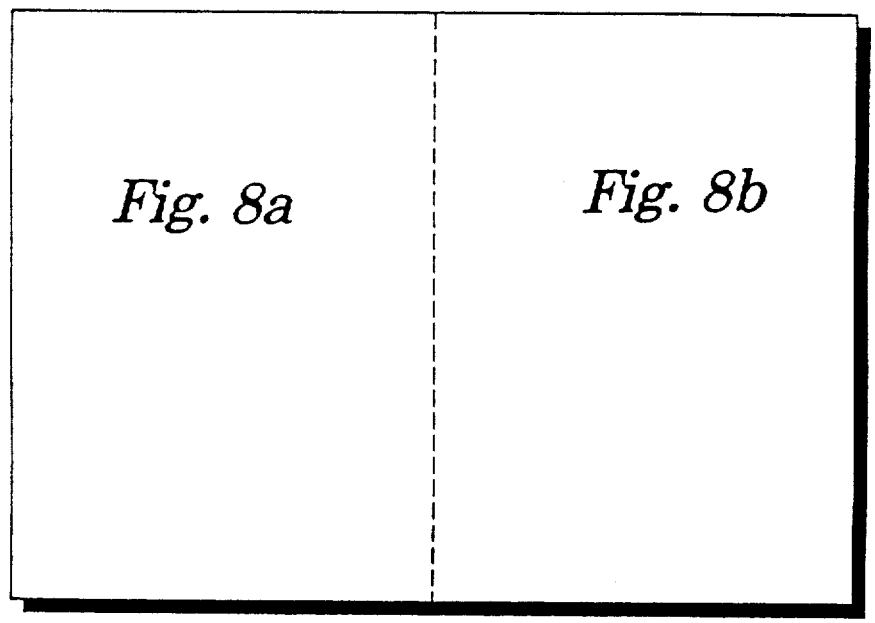
FIGS. 8a and 8b are a block diagram of a four cluster implementation of the multiprocessor cluster system shown in FIG. 7.
Figure 8A:
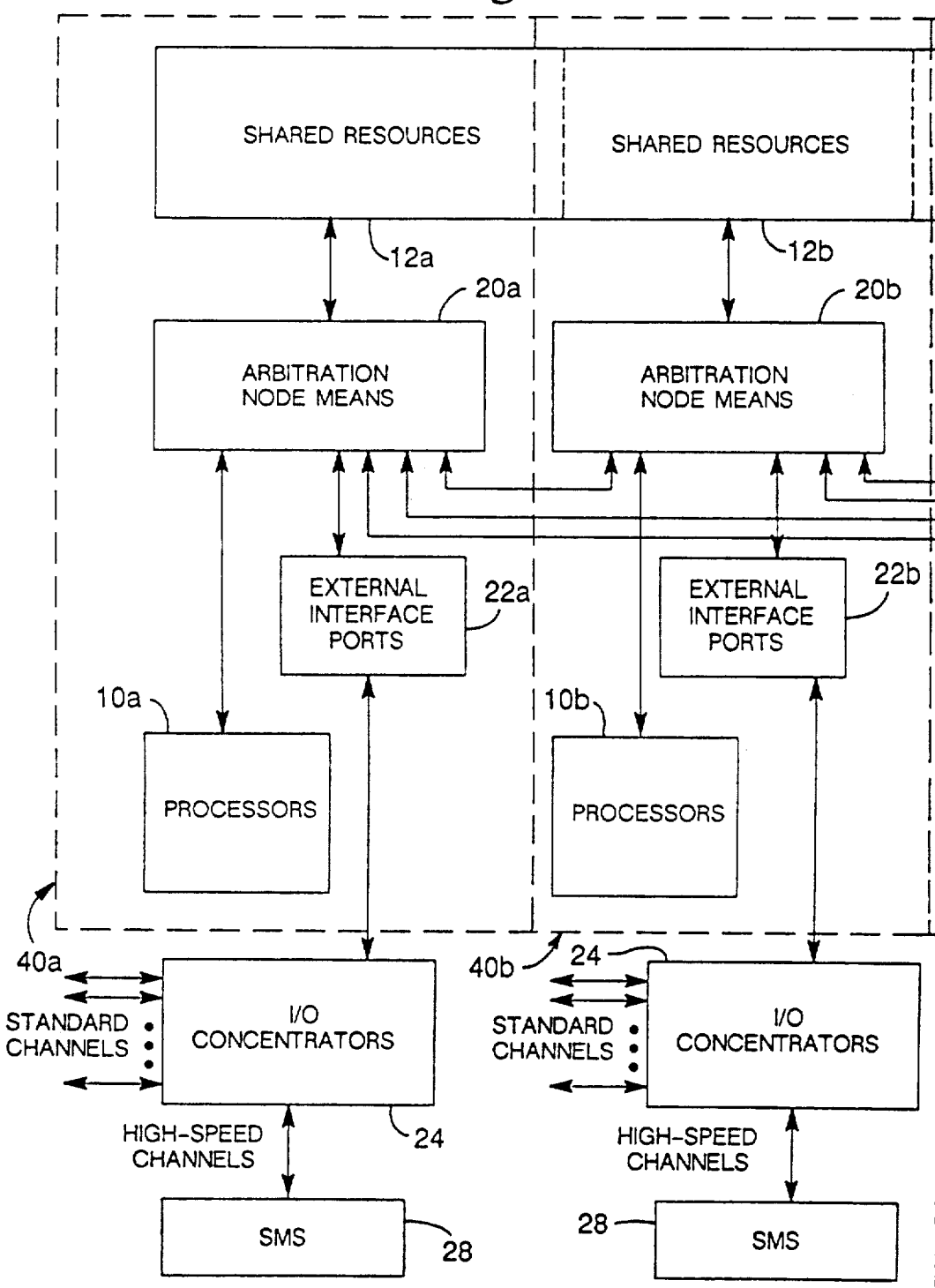
Figure 8B:
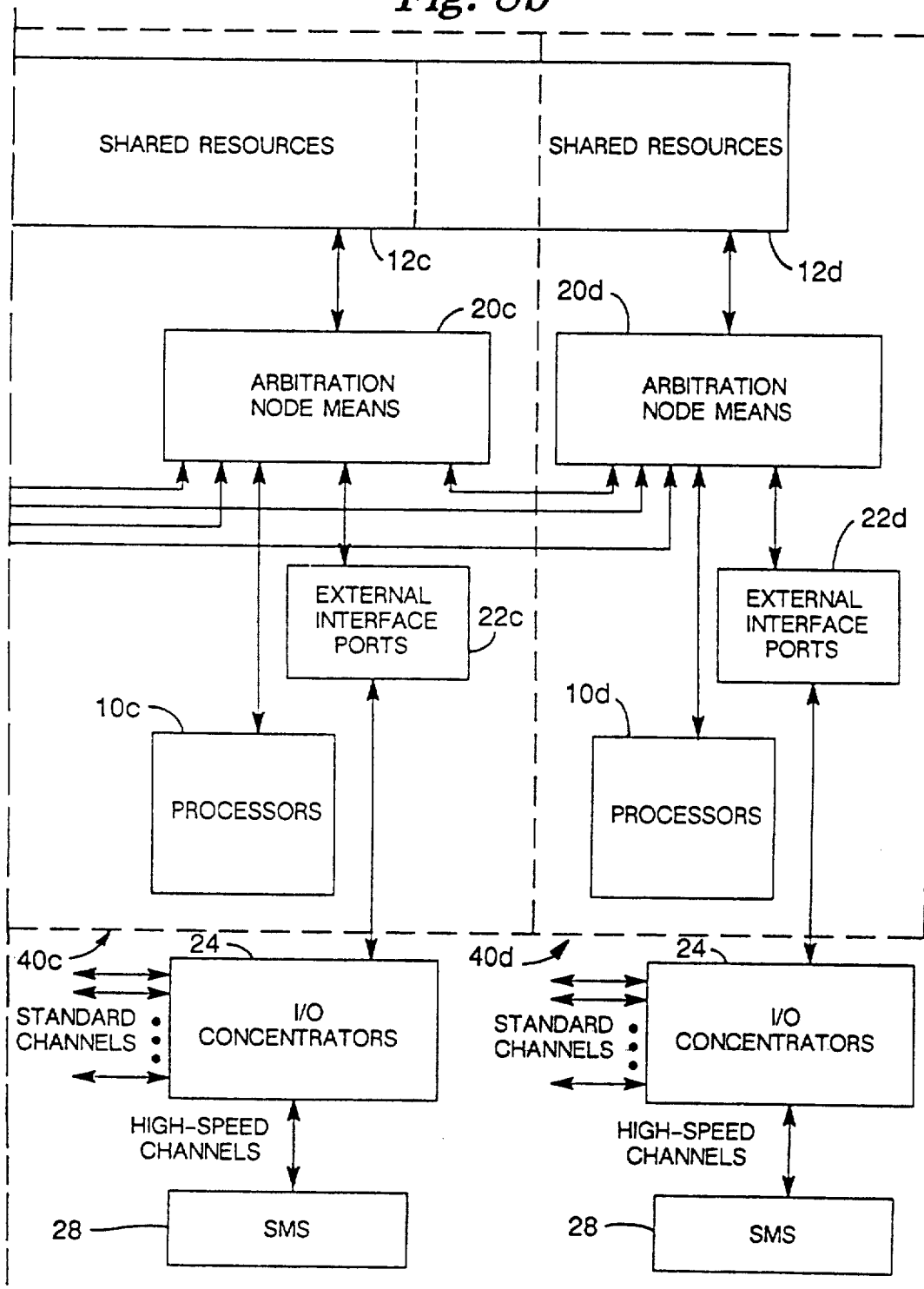

Referring now to FIGS. 8a and 8b, a block diagram of a four cluster version of the multiprocessor system is shown. Each of the clusters 40a, 40b, 40c and 40d physically has its own set of processors 10, shared resources 12, and external interface ports 22 (not shown) that are associated with that cluster. The clusters 40a, 40b, 40c and 40d are interconnected through a remote cluster adapter means (not shown) that is an integral part of each arbitration node means 20 as explained in greater detail in the parent application. Although the clusters 40a, 40b, 40c and 40d are physically separated, the logical organization of the clusters and the physical interconnection through the remote cluster adapter means enables the desired symmetrical access to all of the shared resources 12. The multiprocessor cluster system of the preferred embodiment creates a computer processing environment in which parallelism is favored. Some of mechanisms in the multiprocessor cluster system which aid the present invention in coordinating and synchronizing the-parallel resources of such a multiprocessor system include, without limitation: the distributed input/output subsystem, including the signaling mechanism, the fast interrupt mechanism, and the global registers and the atomic operations such as TAS, FAA, FCA and SWAP that operate on the global registers: the mark instructions, the loadf instruction, the accounting registers and watchpoint addresses; and the various mechanism that support the pipelined operation of the processors 10, including the instruction cache and the separate issue and initiation of vector instructions. Together, and individually, these mechanisms support the symmetric access to shared resources and the multilevel pipeline operation of the preferred multiprocessor system. For a more detailed description of the preferred embodiment of the multiprocessor cluster system for executing the present invention, reference is made to the previously identified parent application, entitled INTEGRATED SOFTWARE ARCHITECTURE FOR A HIGHLY PARALLEL MULTIPROCESSOR SYSTEM.

Referring now to FIGS. 1a and 1b, the various modular components of the present invention will be described. The compiler 200 includes one or more front-end modules that interface the integrated hierarchical representation (IHR) of the present invention with a variety of available programming languages. The preferred embodiment of the compiler 200 provides a Fortran front-end 201 and a C front-end 202. The front ends 201 and 202 generate a representation of the source code in a high-level integrated hierarchical representation referred to as HiForm (HF). The HF representation is used by the optimizer 203, the code generator 204, the LoForm optimizer 205 and the binary generator 206. A low-level integrated hierarchical representation referred to as LoForm (LF) is generated by the code generator 204, as well as by the assembler 210. The LF representation is used by the LoForm optimizer 205 and the binary generator 206. The preferred embodiments of the HF and LF components of the IHR and the relationships between the IHR and the various components of the software development system are described in further detail hereinafter.

The objective of the front-ends 201 and 202 is to produce a representation of the source code for a software program in the first stage (HF) of the integrated hierarchical representation (IHR) of the source code program. The front ends 201 and 202 parse the source code into HiForm. Parsing determines the syntactic correctness of source code and translates the source into an intermediate. Because the C and Fortran front-ends 201 and 202 share the optimizer 203 and code generator 204, the programmer may easily mix different programming languages in the same application. Compiler front-ends for additional languages can be added to the compiler 200 and will share the optimizer 203 and code generator 204 with existing front-ends.

In the preferred embodiment, the C compiler front-end 201 is based on the ANSI X 2.159-1989 C language standard. Extensions to the C compiler front-end 201 provide the same functions to which System V programmers are accustomed in other C compilers. Additional extensions, in the form of compiler directives, benefit CPU-intensive or large engineering/scientific applications. The C compiler front-end 201 performs macro processing, saving the definitions of macros for debugging as part of the IHR as described in greater detail hereinafter. The Fortran compiler front-end 202 is based on ANSI Fortran 77 and contains several extensions for source compatibility with other vendor's Fortran compilers. All extensions can be used in a program unless there is a conflict in the extensions provided by two different vendors. Again, the extensions are saved as part of the IHR as described in greater detail hereinafter. Although the preferred embodiment of the IHR is presented in terms of HF and LF representations capable of supporting both C and Fortran programming languages, it will be appreciated that additions and changes to the IHR may be necessary to support programming features of other programming languages. e.g., Ada, Pascal.

The optimizer 203 performs standard scalar optimizations, and detects sections of code that can be vectorized or automatically threaded and performs those optimizations. The optimizer 203 attempts to improve the HF code so that faster-running object code will result by performing several language and machine-independent optimizations. The optimizer 203 performs aggressive optimizations, which include automatic threading of source code, automatic vectorization of source code, interprocedural analysis for better optimizations, and automatic in-lining of procedures as discussed in greater detail hereinafter. The optimizer 203 also performs advanced dependence analysis to identify every opportunity for using the vector capabilities of the preferred multiprocessor system. The same dependence analysis is used to do multithreading, which makes it possible to concurrently apply multiple processors to a single program. The optimizer also applies a wide range of scalar optimizations to use the scalar hardware in the most efficient manner. Scalar loop optimizations, such as strength reduction, induction variable elimination, and invariant expression hoisting are performed on loops that cannot be vectorized or automatically multithreaded. Global optimizations are performed over an entire procedure. They include: propagation of constants, elimination of unreached code, elimination of common subexpressions, and conversion of hand-coded IF loops to structured loops. In-lining of procedures automatically pulls small, frequently used procedures inline to eliminate procedure call overhead. For a more detailed discussion of the various optimizations that may be invoked by the preferred embodiment of the present invention, reference is made to the previously identified parent application entitled INTEGRATED SOFTWARE ARCHITECTURE FOR A HIGHLY PARALLEL MULTIPROCESSOR SYSTEM.

Optimization is a time- and space-intensive process, even when using efficient algorithms. Selected parts of optimization may be turned off to provide some of the benefits without all of the cost. For example, performing vectorization does not require performing scalar global optimization; however, without performing the global transformation, some opportunities for vectorization may be missed. It will also be recognized that there are situations where it is necessary to have quick compilation, and the optimization phase may be skipped altogether. In the preferred embodiment, each of the optimizers, optimizer 203 and LoForm optimizer 205, may be selectively invoked by a user by inserting appropriate command line statements in a source code program to activate or inactivate desired optimizations.

The code generator 204 takes the HF code from the front ends 201 and 202, via the optimizer 203 if utilized, and translate the HF code into a combined HF and LF representation of the source code program. In essence, the code generator 204 moves the representation of the source code from a language and machine-independent high-level representation (HF) to a machine-dependent low-level representation (LF) that is part of the integrated hierarchical representation.

Once the process of translating the intermediate HF code to LF code is completed, machine-dependent optimizations may be performed by the LoForm optimizer 205. These optimizations attempt to make optimum use of registers, such as keeping the most commonly used variables in registers throughout a procedure. Other optimizations that may be performed by the preferred embodiment include: an instruction scheduler that seeks to simultaneously use the multiple functional units of a particular target machine and minimize the time required to complete a collection of instructions; a linkage tailoring that minimizes procedure call overhead across files; a post-scheduling process that pushes back memory loads as early as possible and performs bottom loading of loops; and a loop unrolling that duplicates the body of the loop to minimize loop overhead and maximize resource usage.

As part of the optimizers 203 and 205, the preferred embodiment of the present invention includes a two-stage means for procedure inlining, first inliner 221 and second inliner 222. Procedure inlining is the process whereby the compiler 200 replaces a procedure call with the actual body of code in the called procedure so that called procedure code executes as part of the program code. When procedure calls are not inlined into program code, the calls are made while the program code executes and can incur significant overhead. The overhead of a procedure call is the cost in time of making a jump to a different section of code and returning from that sectional code and the saving and restoring of registers around these jumps. Inlining saves the overhead of procedure calls being made during the execution of a program. In the preferred embodiment, intrafile inlining is performed at the HF level by the first inliner 221 in connection with optimizer 203 and interfile inlining is performed at the LF level by the second inliner 222 in connection with the LoForm optimizer 205.

In the actual inlining process, procedure call sites are located and matching procedure definitions are found in the IHR. If it is determined that it is beneficial and economical to inline, the equivalent of the statements of the procedure definition in IHR form are copied and added to the IHR at the call site. Copies of all the local variables are also made from the procedure definition and added to the call site. Uses of the formal parameters in the definition are turned into references to temporaries when the copying takes place.

In the preferred embodiment, determination of which call sites are inlined is done automatically so that no user directives are required; however, the user can be explicit about which calls to inline. If a program calls procedures that require large amounts of local storage space, the user may wish to control inlining. Otherwise, the inlining process in the compiler determines which procedure call sites in the program can be inlined. In the method of the present invention, the IHR of the program source code is utilized throughout the inlining process. For example, the inlining process uses the IHR to determine which procedure call sites are inside looping constructs and gives those call sites a high probability of being inlined. Procedure calls within looping constructs are given a higher priority and are allowed to be bigger. Routines over a certain number of statement nodes in size are not inlined since the benefit of inlining large procedures is minimal. The IHR is examined to detect call sites to procedures that are recursive, that require large amounts of local variable storage (stack) space, or that have some characteristic that will prevent the inlined procedure call from behaving exactly as the non-inlined call.

Inlining within the same compilation unit (a single file) is done at compile time by the first inliner 221. Inlining between compilation units (across files) is done at link time, near the end of the compilation process, by second inliner 222. Some call sites cannot be inlined until link time, when the complete intermediate database representation of all compilation units is available and all the information necessary to detect potential inlining problems is available. In the case where procedures are inlined across different files by second inliner 222, information is gathered from the IHR into an interprocedural database. Part of this information contained in the interprocedural database is used by the preferred embodiment of the present invention to select which procedures are to be inlined.

The inliners 221 and 222 also work closely with the inter-procedural analysis (IPA) 230. When the compiler 200 is processing a procedure, there may be calls to other procedures. In the traditional software environment, the compiler 200 has no knowledge of the effects of these other (or called) procedures. Without such knowledge, the compiler 200 is forced to assume the worst and inhibit many optimizations that are safe. Interprocedural analysis (IPA) is the collection and analysis of procedure information. The results of this analysis allow the compiler 200 to optimize across called procedures. Certain optimizations can benefit from inter- procedural analysis. With the use of IPA information, the number of instances where an optimization can be applied should be increased. The optimizations that can benefit from IPA include: common subexpression elimination, forward substitution, redundant store elimination, constant folding, constant propagation, dead code elimination, global common subexpression elimination, vectorization and automatic multithreading. In addition, for each procedure in a program. IPA 230 collects a list of defined or used global variables and counts how many times each variable is defined or used. IPA 230 sums the number of defines and uses of the global variables and sorts them into the order of most frequent use. The most frequently used variables can then be allocated to L registers. The registers for a called procedure are offset from the calling procedure to reduce the number of register saves and restores in a procedure call.

The IPA 230 also works closely with the Linker 214 in performing interprocedural analysis on source code programs that consist of multiple procedure modules, each of which may be compiled separately and then linked together by the linker 214. There are two types of interprocedural analysis that are well known in the prior art, exhaustive and incremental. For exhaustive analysis, a call graph is formed from information in the object code file files and analyzed. This is the "start from scratch" analysis. For incremental analysis, a call graph and analysis are assumed to exist from a previous link of the program, and a small number of modified procedures are replaced in the call graph. This is the "do as little work as possible" analysis. In the traditional System V environment, a programmer can modify a procedure, compile, and link a program without having to recompile any other procedures, since no dependencies exist between procedures. In an IPA environment, dependencies exist between procedures because procedures are basing optimizations upon knowledge of how called procedures behave. Hence, when a called procedure is modified and recompiled, a calling procedure may also need to be recompiled. This problem is solved by recompiling a procedure when any of the procedures it calls has changes in its interprocedural information as determined by the IPA 230.

The compilation advisor 231 functions as an interface between the programmer and the compiler 200. In effect, the compilation adviser 231 allows the optimizers 203 and 205 to ask a programmer optimization-related questions. The compiler 200 identifies the information that it needs and formulates questions to ask the programmer. The compiler 200 saves these questions so the programmer can address them through the compilation advisor. The compilation advisor relays the programmer's answer back to the compiler 200. A second role of the compilation advisor 231 is displaying dependence information so the programmer can attempt to eliminate dependencies. Dependencies among expressions in a program inhibit vectorization and parallelization of parts of the program. Eliminating dependencies enables the compiler 200 to generate more efficient code. When there is no transformation that the compiler can do to eliminate a dependence, the programmer may be able to change the algorithm to eliminate it.

The debugger 212 is an interactive, symbolic, parallel debugger provided as part of a parallel user environment. The debugger 212 contains standard features of debuggers that are commonly available. These features enable a programmer to execute a program under the control of the debugger 212, stop it at a designated location in the program, display values of variable, and continue execution of the program. The debugger 212 of the present invention has several unique features. The combination of these innovative capabilities provide the user functionality not generally found in other debuggers. The debugger 212 has two user interfaces. The first, a line-oriented interface, accepts commands familiar to System V users. The second interface, comprised of windows, is designed to minimize the learning required to use debugger capabilities.

The software architecture of the present invention maintains the information necessary to display high-level language source, for the segment of the program being debugged, in a number of environments (e.g., Machine A, B and C). The compilation system creates a mapping of the high-level program source code to machine code and vice versa. One of several capabilities of the debugger 212 not found in other debuggers is source-level debugging of optimized code. The optimizations that can be applied and still maintain source-level debugging include dead-code elimination, code migration, code scheduling, vectorization, register assignment and parallelization.

The debugger 212 supports debugging of parallel code. A display of the program's dynamic threading structure aids the user in debugging parallel-processed programs. The user can interrogate individual threads and processes for information, including a thread's current state of synchronization. Other commands display the status of standard synchronization variables such as locks, events, and barriers. The debugger 212 provides additional capabilities. For example, a programmer can set breakpoints for data and communication, as well as code. Macro facilities assign a series of commands to one command. Control statements in the command language allow more flexibility in applying debugger commands. Support for distributed processes enables the programmer to debug codes on different machines simultaneously. Numerous intrinsic functions, including statistical tools, aid the programmer in analyzing program data. The debugger 212 support of language-specific expressions allows familiar syntax to be used.

Figure 1:
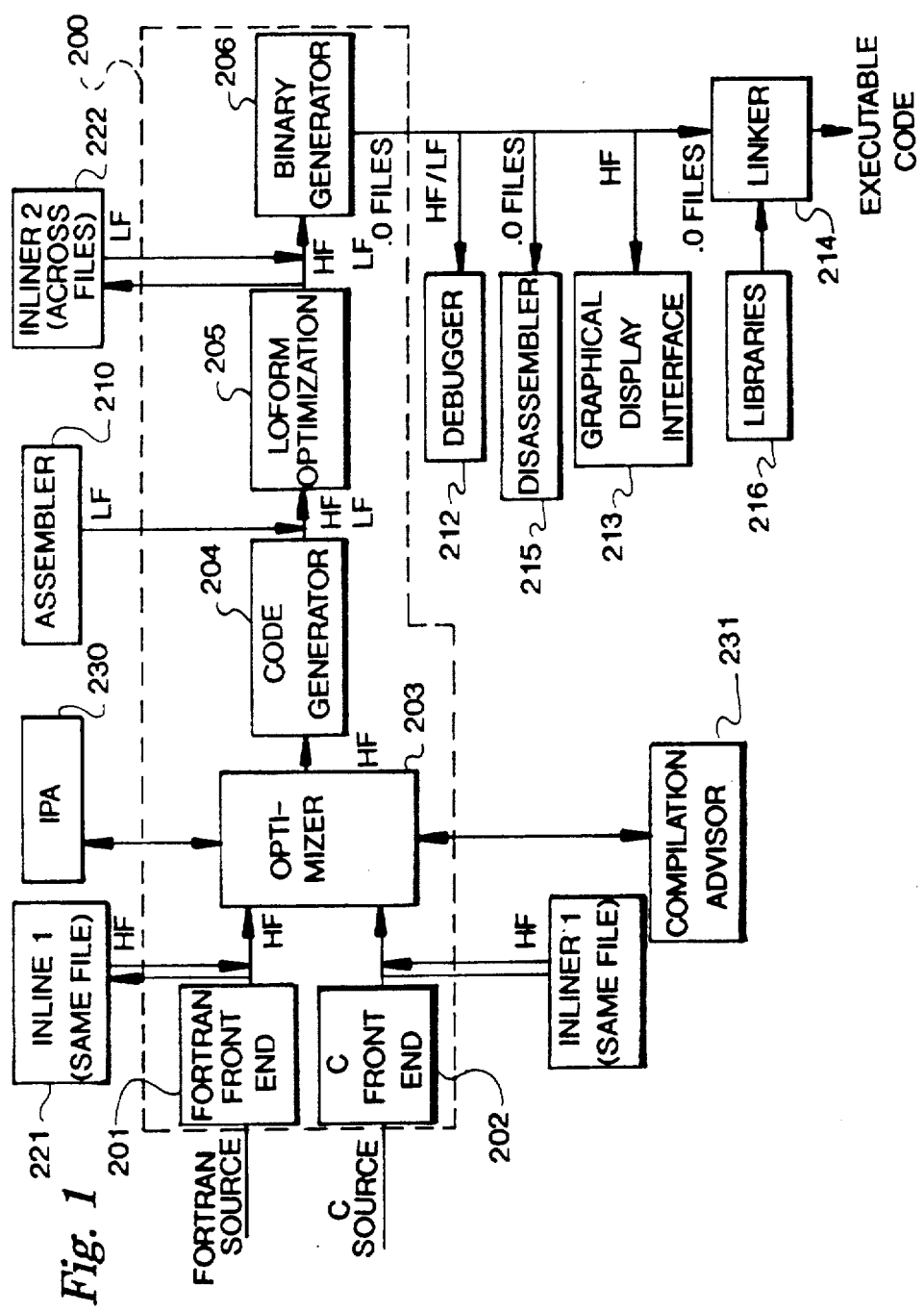
FIGS. 1a and 1b are an overall block diagram of the components of the software development system of the present invention.
Figures 1, 2, 2A:
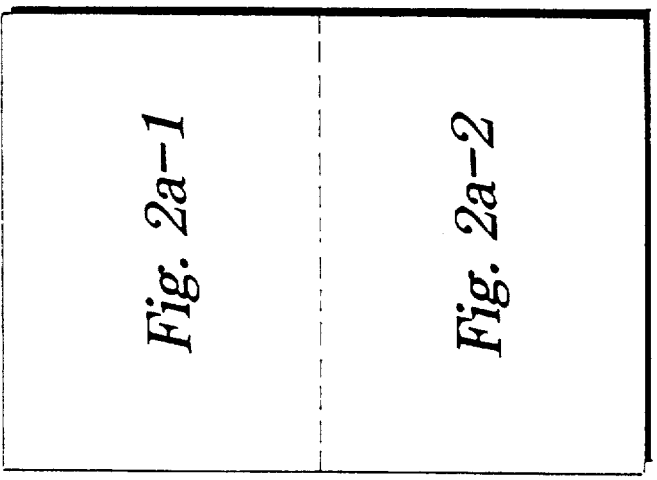
FIG. 2a comprised of 2a-1 and 2a-2, and 2b are overall block diagrams showing the structure of the integrated hierarchical representation (IHR) of the present invention.
Figures 1, 2A:
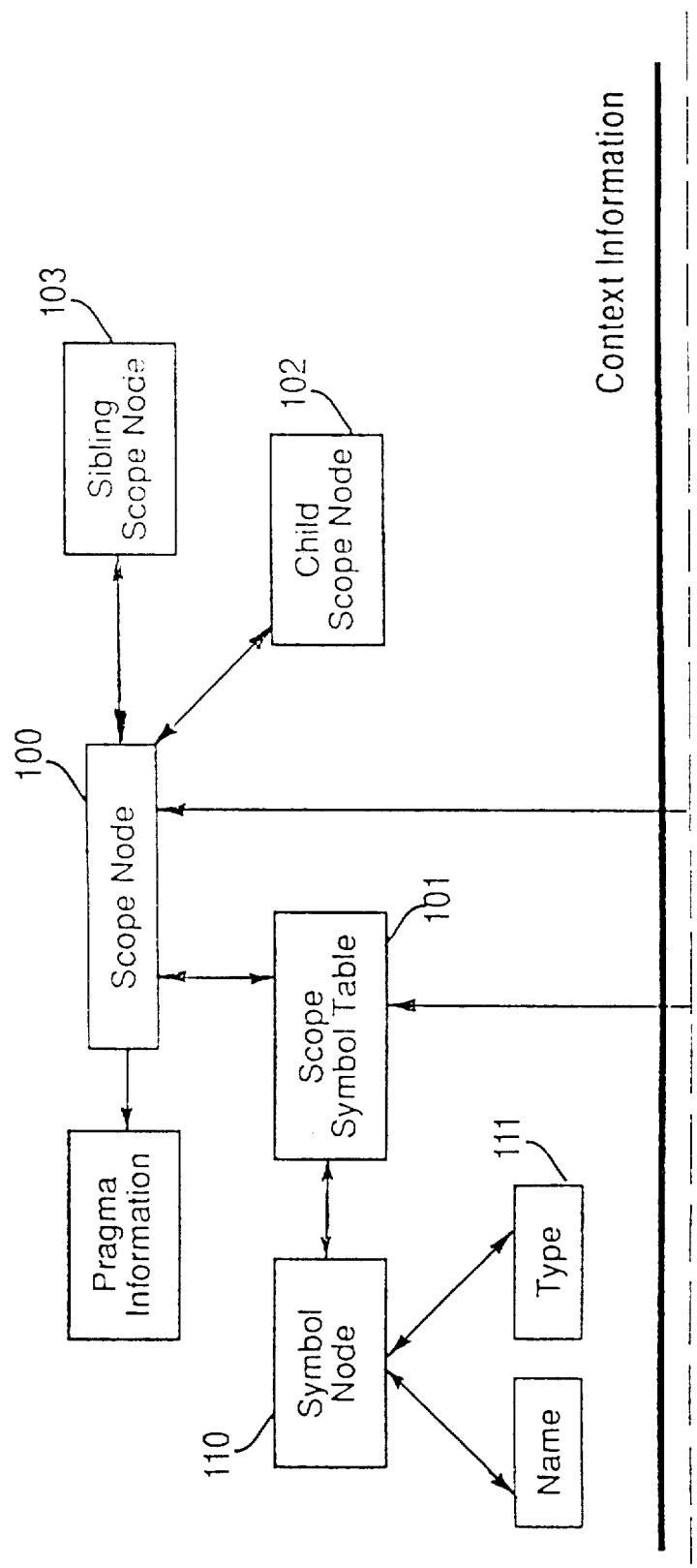
Figures 2, 2A:
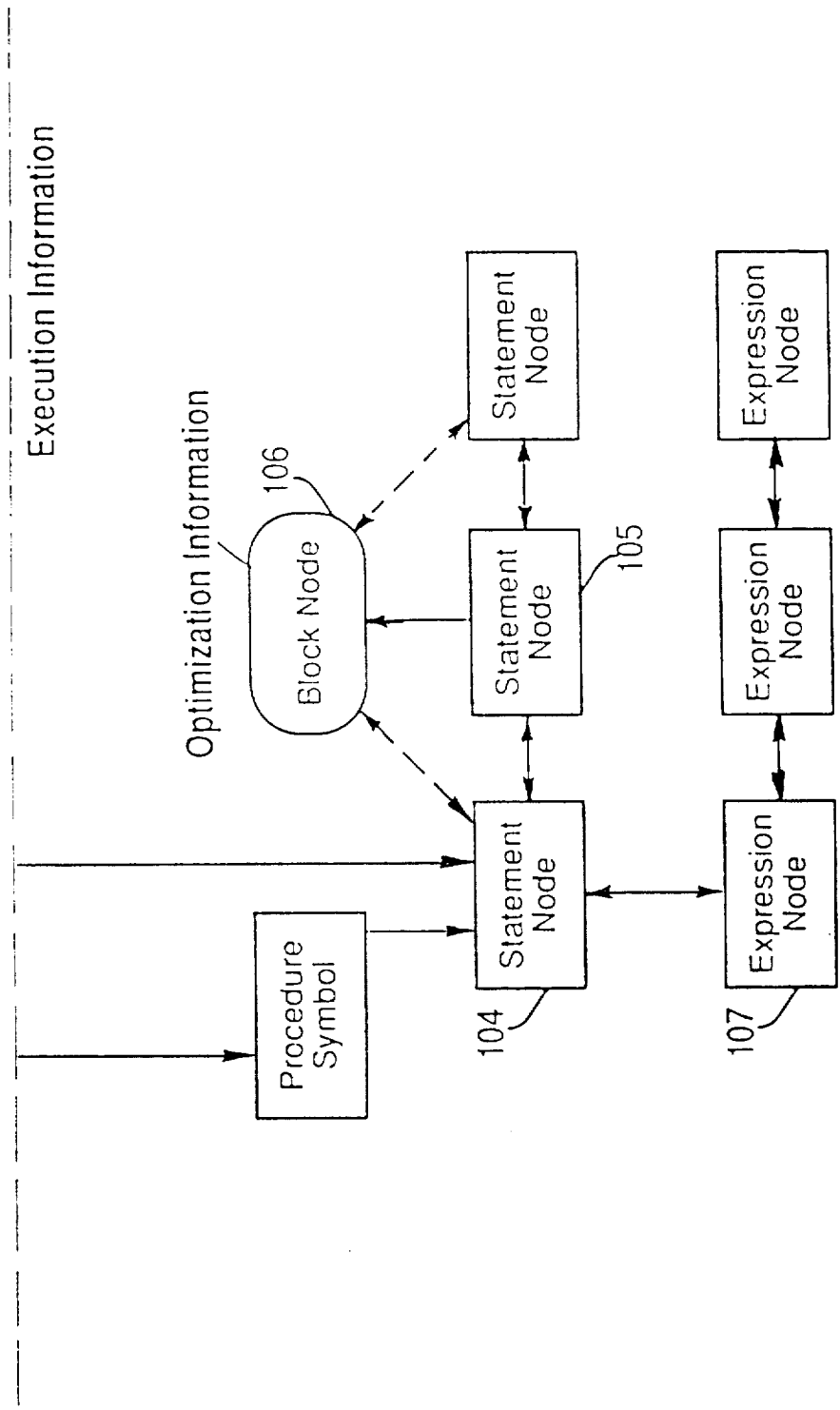
Figure 2B:
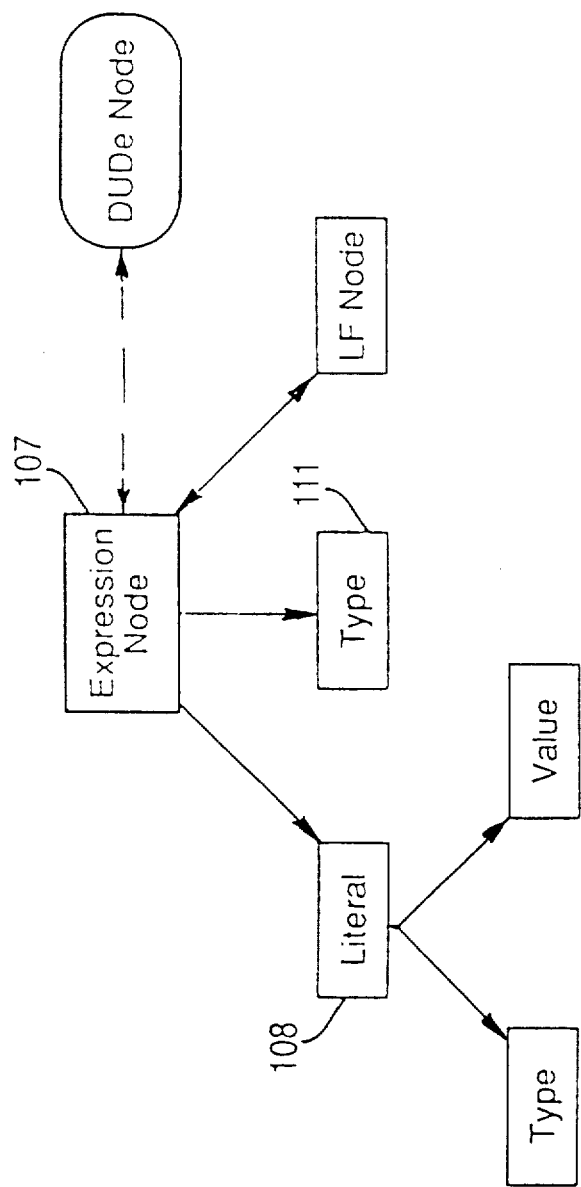

Other optional components of the preferred embodiment of the software development system of the present invention as shown in FIG. 1 include a linker 214 and a disassembler 215. Both the linker 214 and disassembler 215 operate on the object code files (.o files) produced by the compiler 200. The linker 214 may be connected to one or more libraries 216 that contain pre-compiled object code files of existing procedures or routines that may be linked together or accessed by a source code program.

Having described the various components of the preferred embodiment of the software development system, the structure for the preferred embodiment of the integrated hierarchical representation of a computer program will now be described. The first stage of the integrated hierarchical representation (IHR) is called HiForm (HF). HF is a language-independent, intermediate representation of a high level language program. It is produced by the compiler front ends 201 and 202 and the assembler 210. All front ends of the compiler produce the same HF, and HF representations of different programming languages can be merged with each other by inlining without recompilation of source code.

HF is made up of nodes representing semantic elements of the high level program. These nodes contain references to certain broad classes of information about semantic items and data objects by way of indices into tables. The use of table-references instead of pointers for this purpose allows the present invention to take advantage of a highly pipelined vector computer architecture. It also allows greater flexibility in moving or relocating the executable object code file for a program in main memory or in storing the executable object code file in secondary memory.

The HF representation of programs produced by the compiler front-ends 201 and 202 and the assembler 210 is used by the optimizers 203 and 205, inliners 221 and 222, assembler 210, code generator 204, and debugger 212, as well as a graphical compiler development utility 213. The nodal, table-oriented structure of HF efficiently stores the information needed for debugging: source to binary mappings, register usage, and other information needed to debug highly optimized code.

The second portion of the IHR called LoForm (LF), is a graph-structured representation of the machine instructions generated for a program. This graph structure allows several machine dependent optimizations to be performed at the machine code level, while at the same time retaining a relationship to the HF representation of the program for the purpose of maintaining an integrated hierarchical representation.

Referring now to FIGS. 2a-1, 2a-2 and 2b and Tables I-X, the hierarchical structure of the IHR of the present invention will be described. The highest level of information contained in the IHR is scope nodes 100 that represent the static nesting of procedures in a program module. Scope nodes 100 contain information about symbols for that scope 101, scopes nested within that scope 102, and the next scope at the level of the current scope 103. Also represented in the scope node is the first high-level language statement 104 contained in the scope. The structure of a scope node as a defined data structure in C is shown in Table 1. Although the structure of the IHR of the preferred embodiment is presented in terms of specific data structures, it will be recognized that many variations on the particular information contained in the data structure and the manner in which that information can be represented in the data structure could be accomplished and still be within the scope of the present invention.

Each statement node 104 contains information about the kind of statement represented by the node (i.e. assignment statements, if statements, loop statements, etc.). Statement node 104 also contains information about the next statement 105 in lexical order, and a representation of the expressions contained in the statement. As an aid to the debugger 212 in debugging optimized code, the statement node 104 contains an indication of whether or not the statement has been inlined. Another debugging aid for use in debugging optimized code is an indication of the first and last machine instructions generated from the statement. Using this information, the debugger 212 can accurately set breakpoints, even in the presence of code optimized by instruction scheduling. The structure of a statement node is represented in Table II.

Grouping the statement nodes 104 together are the block nodes 106. The block nodes represent the basic blocks of the program. Basic blocks are groups of statements with one entry and one exit. The block nodes 106 contain much of the information needed by the various optimization phases, including bit vectors representing live variable information. The block nodes 106 also contain a depth-first number that is used to index into bit vectors containing this optimization information. The structure of a block node is represented in Table IV.

Expression nodes 107 form a directed acyclic graph to represent high-level language expressions. They contain the information about the operator and operands 108 of the expressions, as well as the data type 111 of the operator. The structure of an expression node is represented in Table V. In many cases, the operands of expression nodes may be literal nodes representing objects with known values at compile time. The structure of a literal node is represented in Table VII.

The data type of an expression is represented by a type node 111. The type node 111 contains information about the components of a type as well as the size of the type. Other information about types is dependent on the type being represented. For example, a type node 111 for an array contains information about the number and sizes of dimensions of the array. The structure of a type node is represented in Table VI.

Symbol nodes 110 represent named items in a high-level language or assembly language program. They contain information about the kind of symbol (variable, type, label, procedure, etc.), the location in a program where the symbol is defined, and an index of the type node 111 indicating the data type of this symbol. Also contained in the symbol node is information for debugging optimized code—the debug mapping 109. A more detailed description of this feature of the present invention is presented in the description of FIGS. 5a and 5b. The symbol node 110 points to an array of bit vectors 150, each bit vector containing one entry for each block node 106 in the program. This array is indexed by the depth-first numbering of the block nodes 106. The structure of a symbol node is represented in Table VIII.

Figure 3:
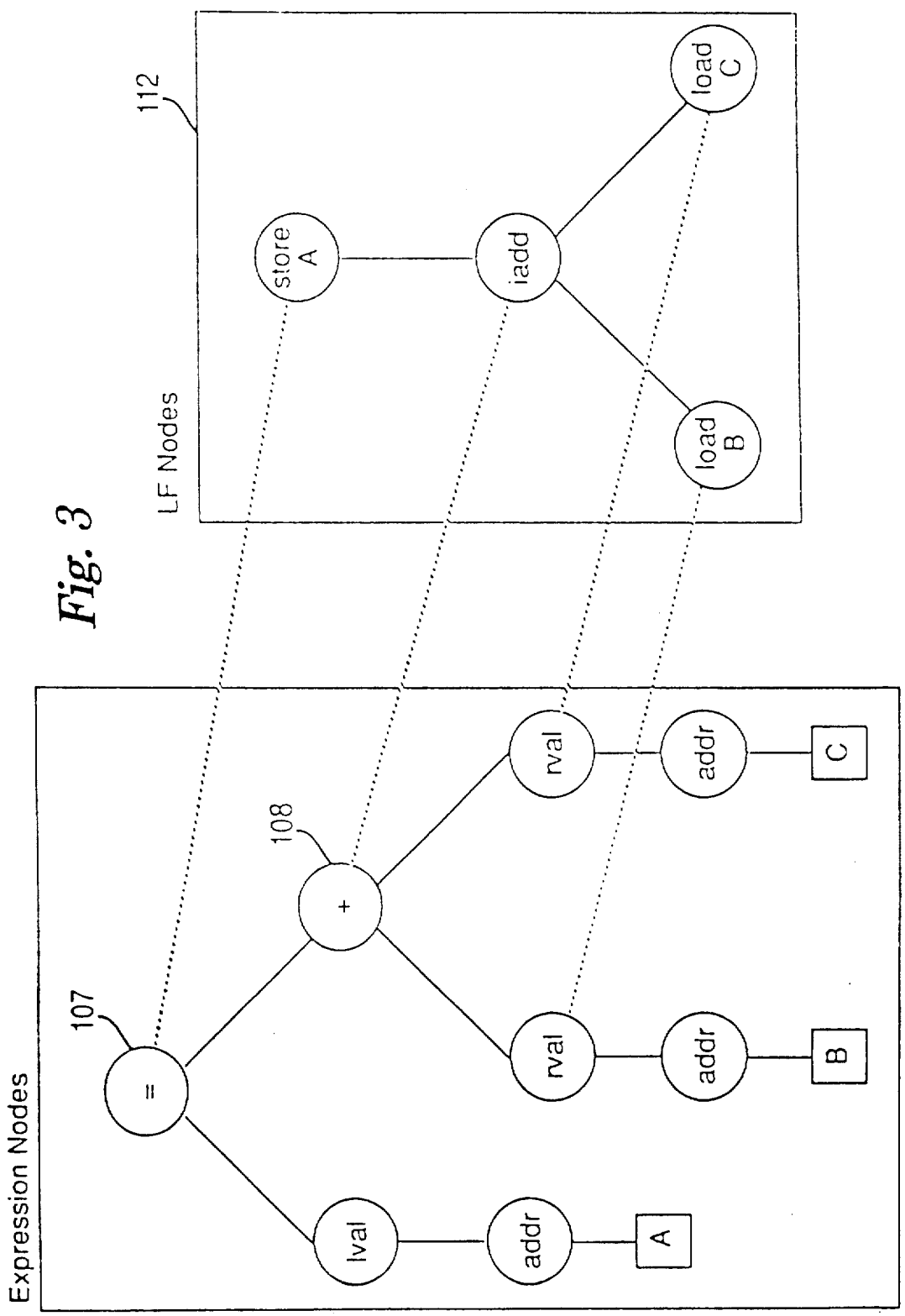
FIG. 3 is a block diagram showing the relationship between the expression nodes and the LF nodes in the present invention.

Referring now to FIG. 3, the structure of the LF portion of the IHR of the present invention will be described. LF nodes 112 are a representation of the machine instructions generated for a program. LF nodes 112 are produced by the code generator and the assembler. The LF nodes 112 contain information about the machine instruction including the opcode, the operands and an indication of the parent expression nodes 107 and 108. The structure of an LF node 112 is represented in Table IX.

One of the components of HF is the Definition Use Dependencies (DUDes). Definition-use information relates a variable's definition to all the uses of the variable that are affected by that definition. Use-definition information relates a variable's use to all the definitions of the variable that affect that use. Definition-definition information relates a variable definition with all definitions of the variable that are made obsolete by that definition. The present invention incorporates definition-use, use-definition and definition-definition information for single and multiple word variables, equivalenced variables, pointers and procedure calls (including all potential side effects) into a single representation (DUDe nodes) that is an integral part of the dependence analysis done for vectorization and multithreading. The structure of a DUDe node is represented in Table X.

Figure 4A:
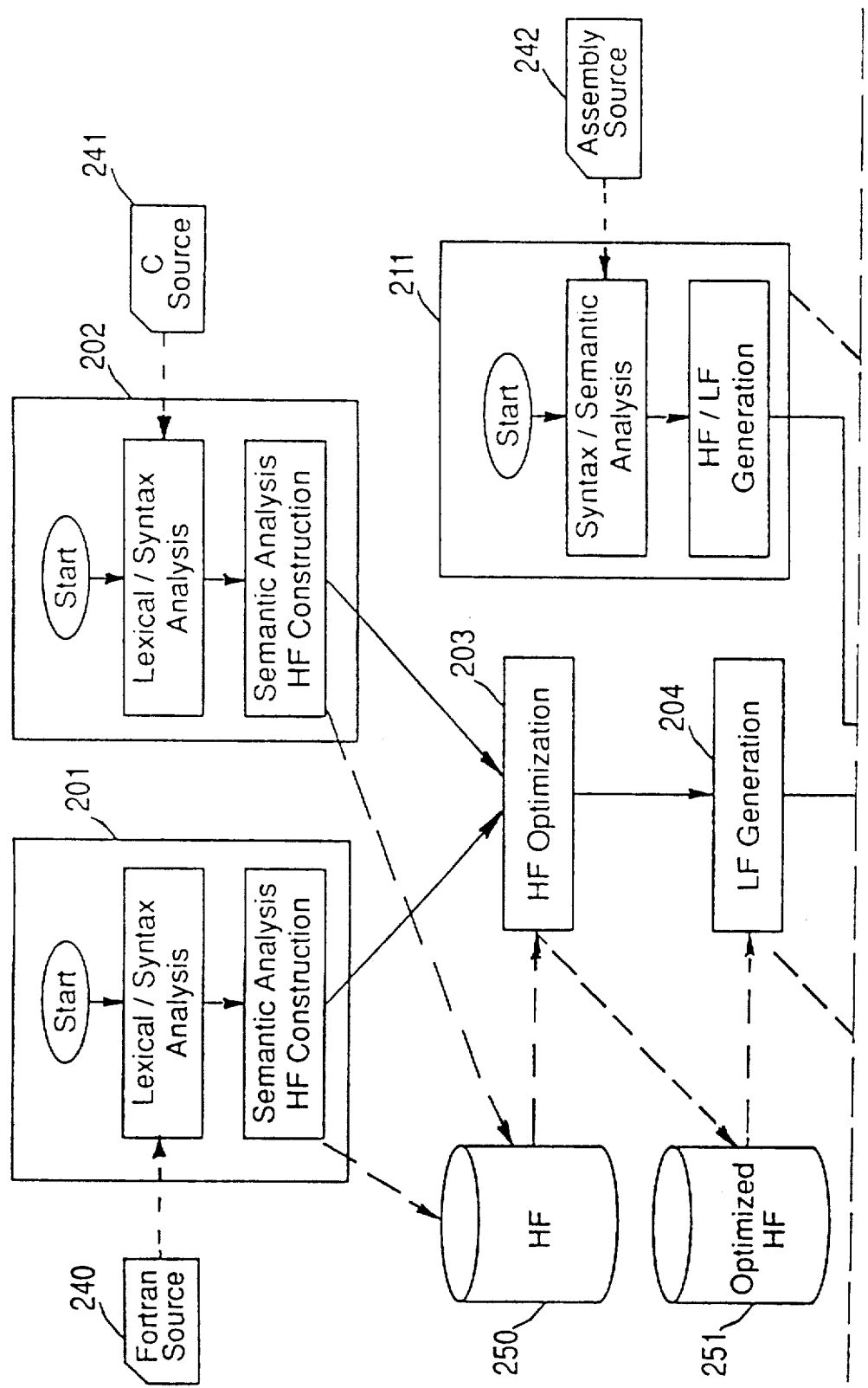
FIGS. 4a and 4b are a flow diagram of the present invention showing the method of translating a source program into the IHR that allows for debugging of highly optimized code inter-language inlining, and optimization and source-level debugging of assembly language programs.
Figure 4B:
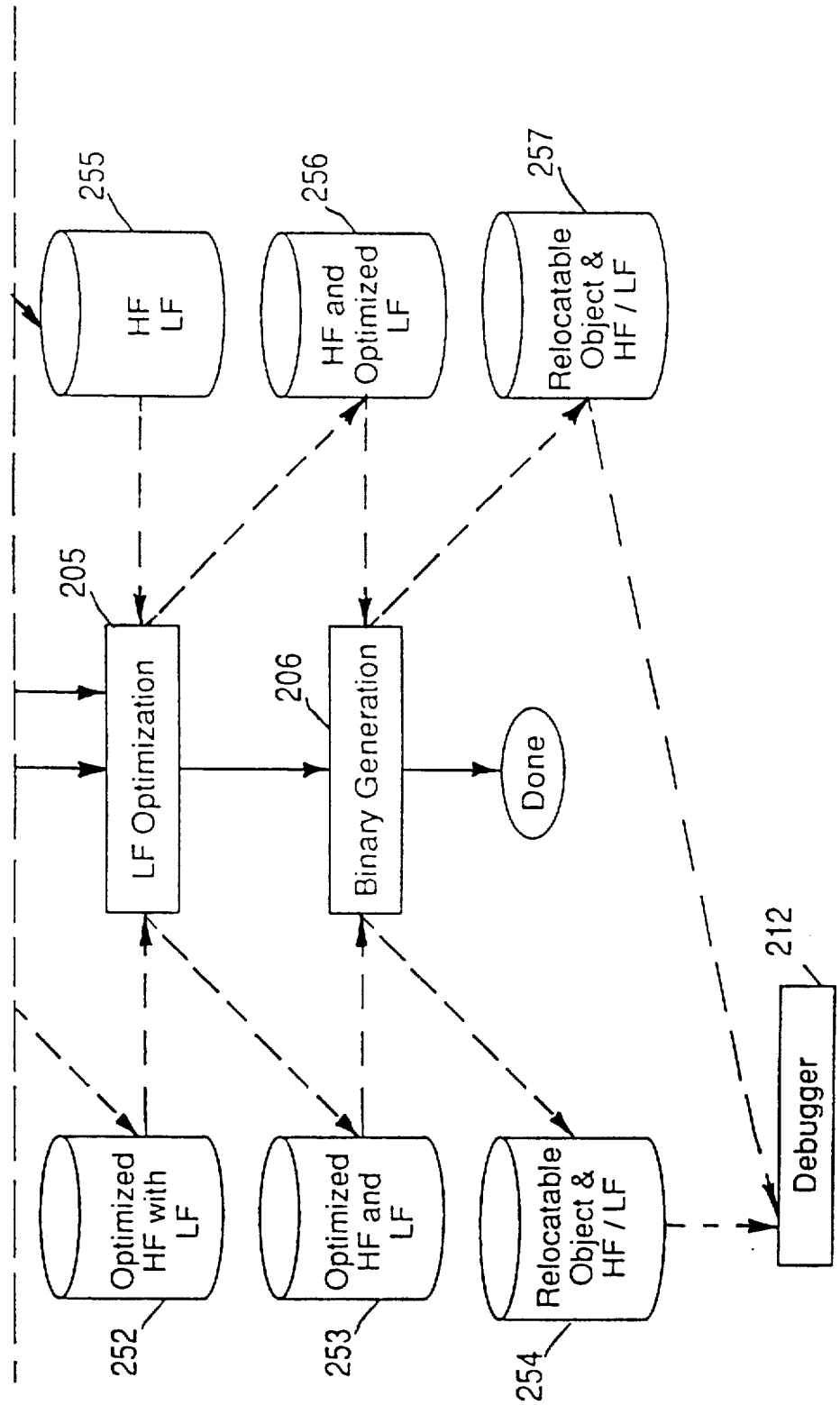

Referring now to FIGS. 4a and 4b, the method for compiling source languages into binary code providing debugging of highly optimized code, inter-language inlining, and optimization and source-level debugging of assembly language programs using the present invention will be described. Each one of a plurality of language front ends 201 and 202 translates a given high level source language to a language-independent intermediate representation HF 250 using well known parsing techniques and other parsing techniques referred to above. HF 250 is then optionally fed into a language independent optimizer 203. The language independent optimizer 203 performs many machine-independent optimizations upon HF 250 and augments HF 250 with information necessary for debugging optimized programs thereby producing optimized HF 251.

At this point, the optimized HF 251 is fed into the code generator 204. The code generator 204 then augments the HF 250 with LF, a machine-independent representation of the instructions generated for a program, thus producing optimized HF with LF 252. Next, optimized HF with LF 252 is fed through another optimization phase 205 which performs machine-dependent optimizations. Optimized HF with LF 252 is further augmented to reflect transformations performed by the LF optimizer 205, producing optimized HF and LF 253. The optimized HF and LF 253 is then fed through the binary generator 206 to produce a relocatable object file 254.

A distinct component, the assembler 211, translates assembly language programs 272 into machine independent representation HF and LF 255. The HF and LF 255 produced by the assembler may then be optionally fed through the LF optimizer 205. The LF optimizer 205 performs optimizations on the assembly language program not performed by prior art systems, producing HF and optimized LF 256. Next, the binary generator 206 reads the HF and optimized LF and produces the relocatable object file 257 containing object code as well as HF and optimized LF.

Another distinct component of the system, the debugger 212 then reads the relocatable object code file 254 and 257 containing optimized HF and LF. Using the information contained in the object code file 254 and 257, the debugger is able to debug both high-level language programs and assembly language programs in the presence of optimizations.

Figure 5A:
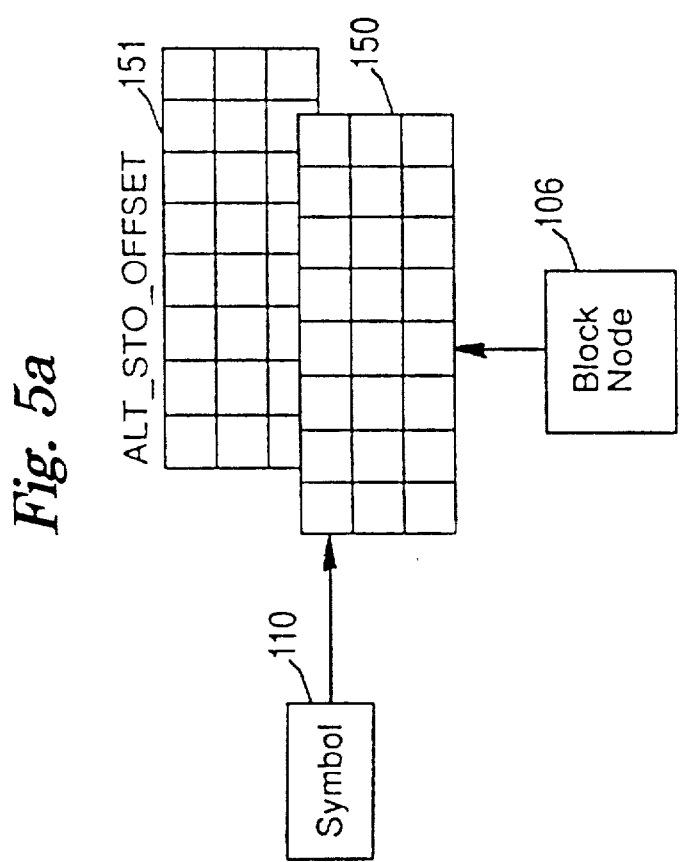

Referring now to FIGS. 5a and 5b, an example of how the additional information represented in the IHR is used to assist in debugging optimized code will be described. A parallel array 151 contains the register number holding the symbol in the current block. The debugger uses the parallel array 151 that is part of the IHR to find the register holding a variable in a block of optimized code by performing the following steps:

1. The current block node 106 is determined using binary to source mappings.
2. The symbol node 110 for the desired variable is determined.
3. The debugger looks through the array of bit vectors 150, checking if the bit indicated by the depth-first number of the current block node 106 is set in any of the bit vectors 150. When a set bit is found, the corresponding entry in the alt_sto_offset array 151 is examined. This entry specifies the register number containing the variable for the current block 106.

Figure 6:
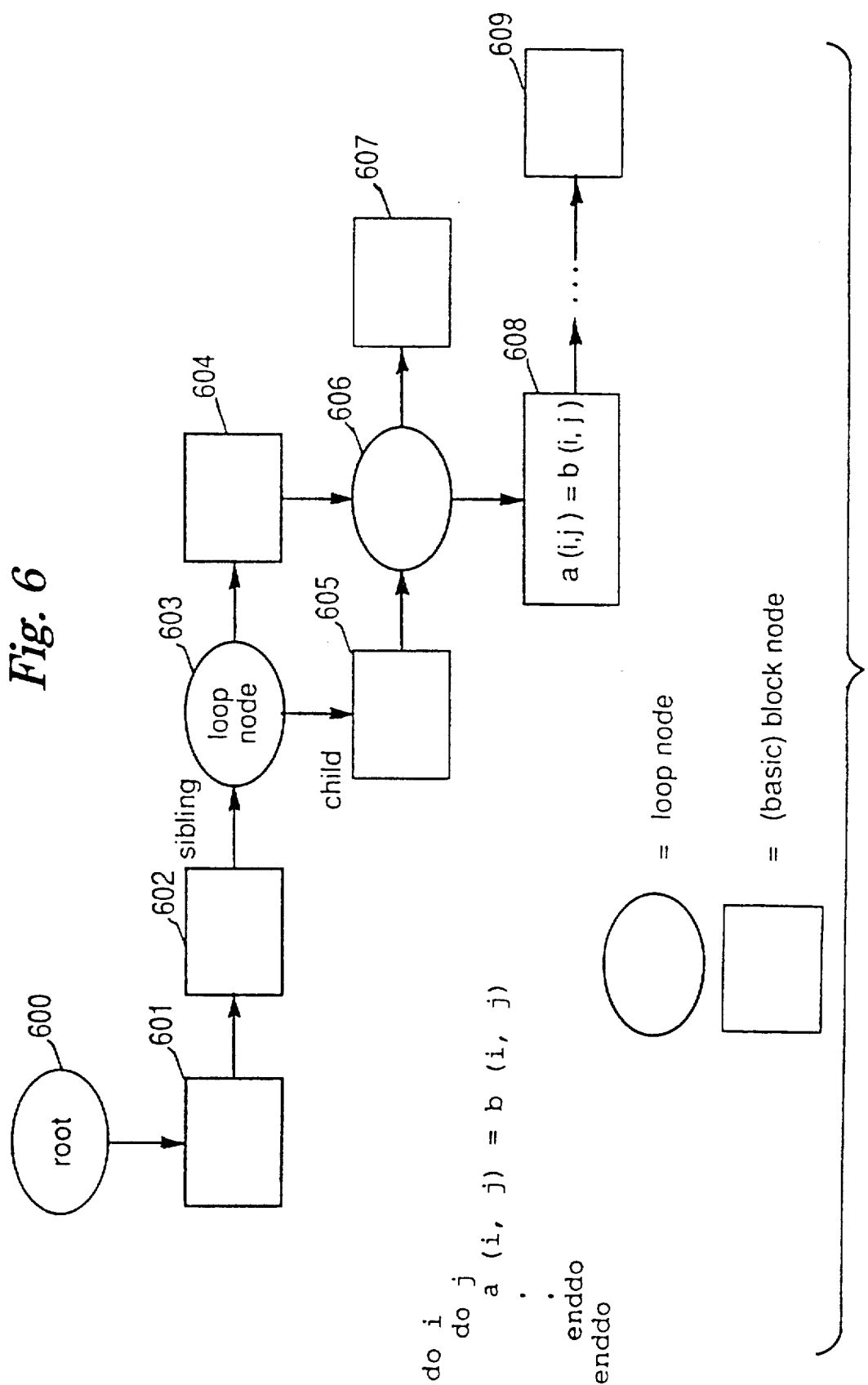
FIG. 6 shows the structure of a loop structure graph containing optimization information.

Referring now to FIG. 6, the structure of the preferred embodiment of the loop structure graph will be explained. The loop structure graph consists of loop nodes and block nodes and represents the static nesting of loops in a high level language program. The root 600 of the structure graph is a pseudo loop surrounding the entire program; children of this loop node are the blocks and loops comprising the program. Block node 602 represents the basic block of the loop prologue for the outer loop. Loop node 603 represents the outer loop itself, while block node 604 represents the epilogue block for the outer loop. Nested within the outer loop 603 is block node 605, the prologue block for the inner loop, as well as loop node 606 and block node 607. Loop node 606 represents the inner loop, while block node 607 represents the epilogue of the inner loop. Contained within the inner loop 606 is the body of the loop comprising block nodes 608 and 609. The structure of the loop node is represented in Table III.

TABLE I

| Scope Node Field | Scope Node Description |
|---|---|
| scope_kind: | The class of this scope. One of the following: UNDEF_SCOPE MODULE_SCOPE PROCEDURE_SCOPE BLOCK_SCOPE STRUCTURE_SCOPE PROTOTYPE_SCOPE |
| scope_symbol: | The symbol defining this scope (a symbol node). |
| scope_symbol_table: | The symbol table contained by this scope. |
| scope_parent: | The parent of this scope (another scope node). |
| scope_sibling: | The sibling of this scope (another scope node). |
| scope_child: | This child of this scope (another scope node). |

The following applies only to MODULE₁SCOPE:

| | |
|---|---|
| scope_macro_symbol_table: | This is the first block symbol node in this scope. |

The following applies only to MODULE_SCOPE and PROCEDURE_SCOPE:

| | |
|---|---|
| scope_first_block | This is the first block symbol node in this scope |

The following applies only to PROCEDURE_SCOPE:

| | |
|---|---|
| scope_first_stack_sym: | First symbol node allocated from the stack and in this procedure. This may or may not be entered into a scope symbol table. |
| scope_last_stack_sym | Last symbol node allocated from the stock and in this procedure. |

These may or may not be entered into a scope symbol table

| | |
|---|---|
| scope_duc_table: | AUX_NODE of the global def/use count table. |

Built for IPA contains a list of global variable symbol nodes counts of the number of definitions and uses for each PROCEDURE_SCOPE

TABLE II

| Statement Node Field | Statement Node Description | |
|---|---|---|
| st_op | Statement Operator. SOPERROR SOPCASE SOPCASECOMP | One of the following: Error statement CASE statement CASE component pseudo statement |
| | SOPCYCLE | CYCLE(F90) or CONTINUE(C) statement |
| | SOPDEAD | DEAD pseudo statement |
| | SOPENDCASE | ENDCASE pseudo statement |
| | SOPENDGROUP | End of SOPGROUP |
| | SOPENDIF | endif STATEMENT |
| | SOPENDLOOP | ENDLOOP pseudo statement |
| | SOPENTRY | ENTRY statement |
| | SOPEXIT | EXIT statement |
| | SOPEXPRESSION | Expression statement |
| | SOPGOTO | GOTO statement |
| | SOPGROUP | Group of statements |
| | SOPIF | IF statement |
| | SOPIFCOMP | IF component pseudo statement |
| | SOPLABEL | LABEL pseudo statement |
| | SOPLOOP | LOOP pseudo statement |
| | SOPNULL | Null statement |
| | SOPPRAGMA | Pragma pseudo statement |
| | SOPRETURN | RETURN statement |

TABLE II-continued

| Statement Node Field | Statement Node Description | |
|---|---|---|
| | SOPREGISTER | Register spill/load pseudo statement. |
| st_sfa | Source file address | |
| st_previous | Node for previous statement in lexical order. | |
| st_next | Node for next statement in lexical order. | |
| st_block | Block node for basic block containing this statement. | |
| st_lf_start | First LoForm node associated with this statement. Set by backend. | |
| st_lf_end | Last LoForm node associated with this statement. Set by backend. | |
| st_inlined | Bit set => This statement has been inlined to its current location. | |
| st_inlining_root | If st_inlined_( ) is TRUE then this is the statement that caused the statement to be inlined. | |
| st_well_structured | Bit set => This structured statement (SOPCASE, SOPIF, SOPLOOP) is well-formed, i.e. there are no branches into it from outside or between its components. Exit branches may exist, however. Set by global flow analysis. | |
| st_has_call | Bit set => This statement has an EOPCALL under it somewhere. | |

TABLE III

| Loop Node Field | Loop Node Description |
|---|---|
| stmt | Statement node corresponding to this loop. |
| prologue | Block node which is the prologue of this loop. |
| head | Block node which is the header of this loop. |
| tail | Block node which is the tail of this loop (from which there is a backedge to the head.) |
| epilogue | Block node which is the epilogue of this loop. |
| child | Child node in Structure Graph; first block node in body of loop (always the loop's header). |
| sibling | Sibling node in Structure graph (always a BLOCK node) |
| guard | Logical expression controlling execution of this loop (may be relative to some enclosing condition). |
| clear_bv | Aux node of bit vector representing symbols which are clear of (re) definition in this loop. |
| exit_bv | Aux node for bit vector representing block nodes from which this loop is exited. |
| next | Loop next consisting of all loops which enclose this loop (i.e. this loop is NOT part of this nest). |
| iv_table | Aux node for table of IV's in this loop. |
| iv_count | Number of induction variables in this loop. |
| ps_table | Aux node for table of promoted scalars in loop. |
| ps_count | Number of promoted scalars in this loop. |
| invar_stmt | First invariant statement hoisted to prologue block. |
| completed | Bit set => The body of this loop has been completed; used during SG construction. |
| vectorizable | Bit set => Loop is vectorizable. |
| part_vectoriaable | Bit set => Loop is partially vectorizable. |
| taskable | Bit set => Loop is taskable. |
| innermost | Bit set => Loop is innermost in its nest. |
| has_unknown_call | Bit_set => Loop contains call to an unknown procedure. |
| has_exit_branch | Bit_set => Loop contains an exit branch. |
| has_back_branch | Bit_set => Loop contains a backward branch. |
| has_many_entries | Bit_set => Loop is entered at more than one place. |
| has_perfect_subnest | Bit_set => Loop has perfect subnest beneath it. Temporary used by vector |

TABLE III-continued

| Loop Node Field | Loop Node Description |
|---|---|
| | analysis to point to a list of hazards. |

TABLE IV

| Block Node Field | Block Node Description |
|---|---|
| first_stmt | First statement node in basic block. last_stmt Last statement node in basic block. |
| pred_list | Control flow predecessor list. This is represented by an HF node list. |
| pred_count | Number of control flow predecessors. |
| succ_list | Control flow successor list. This is represented by an HF node list. |
| succ_count | Number of control flow successors. Fall_through Target block of the "fall through" edge from this block (only if this block is terminated by a conditional branch) |
| previous | Node for previous basic block in lexical order. |
| next | Node for next basic in lexical order. |
| sibling | Sibling node in Structure graph. |
| guard | Logical expression controlling execution of this loop (may be relative to some enclosing condition). |
| loop_mark | Corresponding SOPLOOP statement if this block is a loop header; of loop node corresponding to a loop header or tail block. Set and used during flow graph and structure graph construction. |
| loop_tail | Corresponding loop tail block if this block is a loop header. |
| loop_head | Corresponding loop header block if this block is a loop tail. |
| nest | Loop nest in which this block resides. |
| parent | Parent loop node in the Structure Graph (loop that immediately encloses this block). |
| exit_level | Number of loops exited from this block. |
| connected | Bit set => This block is connected to the control flow graph |
| visited | Bit set => This block has been visited. Used by algorithms which traverse the flow graph recursively. Must be cleared before reuse. |
| has_call | Bit set => This block contains at least one procedure call. |
| has_unknown_call | Bit set => This block contains a call to a procedure about which nothing is known. |
| has_loop_stmt | Bit set => This block contains an SOPLOOP statement. |
| ia_loop_head | Bit set => This is the "header" (entry) block of a loop. All other blocks in the loop are dominated by this block. |
| is_loop_tail | Bit set => This is the "tail" block of a loop. It contains the (last) iteration test and branch to the loop's header block. |
| is_loop_prologue | Bit set => This is the prologue block of a loop. Its only successor is the header of that loop. |
| is_loop_epilogue | Bit set => This is the epilogue block of a loop. All normal exits from the loop should go through this block. |
| is_loop_exit | Bit set => Control flows from this block out of the loop or loops which contain it AND this is not a loop tail block. I.e. there is a premature loop exit from this block. |
| has_ind_refs | Bit set => This block has indirect references in it. This is used by the scheduler to call for additional analysis. |
| dfn | Number giving position in depth-first ordering. |
| ordinal | The ordinal value for a lexical ordering of blocks in the compilation unit; this works hand in hand with st_ordinal_( ). |
| in | Aux node of bit vector representing blocks |

TABLE IV-continued

| Block Node Field | Block Node Description |
|---|---|
| | that reach this block in the flow graph. |
| out | Aux node of bit vector representing blocks reached from this block in the flow graph. |
| dom | Aux node of bit vector representing blocks which dominate this block in the flow graph. |
| gen_def | Aux node of bit vector representing definitions which are generated by this block. |
| kill_def | Aux node of bit vector representing definitions which are killed by this block. |
| in_def | Aux node of bit vector representing definitions which reach the beginning of this block. |
| out_def | Aux node of bit vector representing definitions which reach the end of this block. |
| x_def | Aux node of bit vector representing exposed definitions (first definitions of variables) in this block. |
| x_use | Aux node of bit vector representing exposed uses in this block. |
| clear | Aux node of bit vector representing the clear vector for this block. (a bit is set for symbols NOT defined in this block) |
| clear_record | Aux node of bit vector representing the clear vector for structured components in this block. (a bit is set for records NOT defined in this block). |
| alt_sto | Aux node of bit vector representing (register) colors used in this block. |
| first_dude | First in a linked list of DUDe nodes associated with this block. |
| pd_pred | Predecessor of this node in the post-dominator tree. |
| pd_succ_list | Successors of this node in the post-dominator tree. These are represented by an HF node list. |
| cd_in_list | HF node list of nodes upon which this node is control dependent. |
| cd_out_list | HF node list of nodes that are control dependent upon this node. node structure: |

TABLE V

| Expression Node Field | Expression Node Description |
|---|---|
| ex_op | One of the following expression operators: |
| | EOPERROR. error expression |
| | EOPADD. add |
| | EOPADDR. address of. |
| | EOPAND. logical conjunction |
| | EOPASSIGN. assignment |
| | EOPCALL. procedure (function) call |
| | EOPCONCAT. string concatenation |
| | EOPCONVERT. convert type of operand |
| | EOPDIV. divide |
| | EOPENTRY. entry point |
| | EOPEQ. equal |
| | EOPEQV. logical equivalence |
| | EOPEXP. exponent |
| | EOPGE. greater than or equal |
| | EOPGROUP. algebraic grouping |
| | EOPGT. greater than |
| | EOPJMP. unconditional jump |
| | EOPJMPA. assigned jump |
| | EOPJMPF. jump if false |
| | EOPJMPT. jump if true |
| | EOPJMPX. jump indexed |
| | EOPLE. less than or equal |
| | EOPLINK. placeholder |
| | EOPLIT. literal |
| | EOPLT. less than |
| | EOPLVAL. l-value |
| | EOPMOD. modulo |
| | EOPMULT. multiply |
| | EOPNE. not equal |

TABLE V-continued

| Expression Node Field | Expression Node Description |
|---|---|
| | EOPNOT. logical negation |
| | EOPNULL. null (used as a placeholder) |
| | EOPOR. logical inclusive disjunction |
| | EOPRANGE. range of values of discrete type |
| | EOPREM. remainder |
| | EOPRENAME. type rename |
| | EOPRETURN. return |
| | EOPROL. rotate left |
| | EOPROR. rotate right |
| | EOPRVAL. r-value |
| | EOPSELECT. record/union member selection |
| | EOPSEQ. sequence of integral values |
| | EOPSHL. shift left |
| | EOPSHR. shift right |
| | EOPSUB. subtract |
| | EOPSUBSCRIPT. subscript |
| | EOPSUBSTR. substring |
| | EOPUADD. unary add |
| | EOPUSUB. unary subtract |
| | EOPXOR. logical exclusive disjunction |
| ex_data_type | Type node for data type of this expression. |
| ex_parent | Statement node for first statement referencing this expression. |
| ex_src_offset | Source file byte offset of the first character in this expression. |
| ex_indegree | In-degree of this node. |
| ex_value-class | Value class of expression. Set and used in common subexpression evaluation. |
| ex_addr_kind | Kind of address (BIT_ADDR, BYTE_ADDR WORD_ADDR or UNDEF_ADDR) represented by an address expression. |
| ex_rank | Rank of this expression (0 => scalar, 1 => vector, ...). |
| ex_lf | Root node of LowForm (LF) generated for this node. Set by the code generator. |
| ex_lf_generated | Bit set => LF has been generated for this node. |
| ex_fortran_assign | Bit set => This assignment expression represents a Fortran ASSIGN statement. |
| ex_call_inline | Bit set => This EOPCALL should be inlined. |
| ex_has_alt_returns | Bit set => This EOPCALL has alternate returns (Fortran). |
| ex_visited | Bit set => This EXPR_NODE has been visited in some sort of temporary depth first search or traversal. It must be cleared after the temporary use by the code using it. |

TABLE VI

| Type Node Field | Type Node Description |
|---|---|
| ty_op | Root "operator" of this data type. One of the following: TOPUNDEF TOPERROR TOPNULL TOPVOID TOPUNTYPED TOPBYTE TOPSBYTE TOPUBYTE TOPMBYTE TOPSHORT_INT TOPINT TOPLONG_INT TOPSHORT_UINT TOPUINT TOPLONG_UINT TOPSHORT_FLOAT TOPFLOAT |

TABLE VI-continued

| Type Node Field | Type Node Description |
|---|---|
| | TOPLONG_FLOAT TOPCOMPLEX TOPLONG_COMPLEX TOPCHARACTER TOPSTRING TOPLOGICAL TOPENUMERATION TOPCONSTRAINT TOPACCESS TOPADDRESS TOPARRAY TOPRECORD TOPSET TOPUNION TOPPROCEDURE TOPFILE |
| ty_size | Exact bit size of an object of this type. |
| ty_container_size | Bit size of the container allocated for a single object of this type. |
| ty_left_justified | Bit set => Objects of this type are left justified within their containers. |
| ty_is_volatile | Bit set => Objects of this type are volatile. |
| ty_is_const | Bit set => Objects of this type are read-only. |
| ty_basic | Bit set => This is a basic, fixed-size data type. |
| ty_is_signed | Bit set => Objects of this type are signed. |
| ty_entered | Bit set => This node is entered in the type graph. |
| ty_assumed_size | Bit set => Objects of this type assume their sizes dynamically. |
| ty_visited | Bit set => This TYPE_NODE has been visited in some sort of temporary depth first search or traversal. It must be cleared after the temporary use by the code using it. |
| ty_hash | Hash value computed for this type node. |
| ty_next | Link for hash collision resolution. |

TABLE VII

| Literal Node Field | Literal Node Description |
|---|---|
| lt_data_type | A type node for the data type of literal. |
| lt_next | Link for hash collision resolution. |
| lt_val | Value of literal. This contains a union of all possible target values for basic types, a union of two node_types (literal nodes) for complex types, or a string_type or aggregate types (like TOPSTRING or TOPARRAY). |
| lt_hash | Hash code for this literal. |
| lt_entered | Bit on => Literal has been hashed. |

TABLE VIII

| Symbol Node Field | Symbol Node Description |
|---|---|
| sy_kind | Class of symbol. One of the following: UNDEF_SYM BLOCK_SYM COMPONENT_SYM CONSTANT_SYM ENUMERATION_SYM ERROR_SYM LABEL_SYM MACRO_SYM MODULE_SYM PARAMETER_SYM POINTEE_SYM PROCEDURE_SYM TAG_SYM TYPE_SYM VARIABLE_SYM |
| SY_name | String containing name of symbol. |
| sy_data_type | Data type node for symbol. |
| sy_next | Next symbol in list of symbol nodes used for hash collision resolution. Set when a symbol is entered in a symbol table. |
| sy_sfa | Source file address of first occurrence of symbol. |

TABLE VIII-continued

| Symbol Node Field | Symbol Node Description |
|---|---|
| sy_hash | Hash code for name, filled in by syt_enter( ) or syt_lookup_or_enter( ) |
| sy_declared | Flag indicating symbol has been explicitly declared. |
| sy_c_defined | Flag indicating symbol has a defining declaration (used in C) |
| sy_type_declared | Flag indicating symbol's data type has been explicitly declared. |
| sy_redeclared | Flag indicating that symbol has been declared more than once. |
| sy_used | Flag indicating that variable or parameter is used (read). |
| sy_defined | Flag indicating that variable or parameter is defined (written). |
| sy_aliased | Flag indicating that symbol has an alias. Set by optimizer. |
| sy_internal | Flag indicating that symbol is declared internally by the compiler. |
| sy_saved | Flag indicating that symbol appears in a Fortran SAVE statement. |
| sy_assigned_label | Flag indicating that variable appears in a Fortran ASSIGN statement. |
| sy_target_goto | Flag indicating that symbol was the target of a GOTO statement |
| sy_use_register | Flag indicating C "register" variable or parameter. |
| sy_associated | Flag indicating that this symbol has had it's address taken. |
| sy_visited | Bit set => This SYM_NODE has been visited in some sort of temporary depth first search or traversal. It must be cleared after the temporary use by the code using it. |
| sy_bfd_used | Flag indicating that the bfd has seen a use of this symbol. |
| sy_bfd_defined | Flag indicating that the bfd has seen a definition of this symbol. |
| sy_temp | Reusable section that must be cleared by whomever uses it. |
| sy_placeholder | Bit set => This SYM_NODE placeholder for the SYM_NODE contained in sy_placeholder_sym_( ). |
| sy_bv_index | The bit vector index of this symbol into the clear and exposed use bit vectors (blk_clear_and Blk_x_use_) set during dependence graph construction and used for live variable analysis. |
| sy_label_depth_id | The compound statement depth id of the compound statement containing this label (C only) |

TABLE IX

| LoForm Node Field | LoForm Node Description |
|---|---|
| bin_address | Byte offset from beginning of procedure of instruction. |
| hf | HF expression node that generated this LF node. |
| offset | Offset to be added into a base by binary table generator. |
| word | The offset in words to the beginning of the lf node. |
| parcel | The offset in parcels from the base of the above word |
| op | The machine opcode for this instruction. |
| opnd1 | Operand 1 of this LF node. |
| opnd2 | Operand 2 of this LF node. |
| opnd3 | Operand 3 of this LF node. |
| opnd4 | Operand 4 of this LF node. |
| next | Unscheduled order of LF nodes. |
| rdg | Node in scheduler dependence graph corresponding to this lf node. |
| use_count | Use count for register allocation. |

TABLE X

| DUDe Node Field | DUDe Node Description |
|---|---|
| dude_parent | The parent expression node associated with this DUDe Node. |
| dude_next | The next DUDe node. |
| dude_previous | The previous DUDe node. |
| dude_block | The Block node which contains this DUDe node. |
| dude_sym | The symbol node pointed to by this DUDe node. |
| dude_in | The set of Dependence Arcs that are pointing into this DUDe Node. |
| dude_out | The set of Dependence Arcs that are pointing out of this DUDe Node. |
| dude_ptr_ind_lvl | the indirection level of the reference if it is a pointer. |
| dude_bv_index | The Bit Vector Index of the definition (LVAL) corresponding to this DUDe node. |
| dude_kind | An enumeration identifying the type of reference, USE, DEF, USE/DEF, INDIRECT USE, INDIRECT DEF, or CALL. An indirect use is something like "i = *p" which is a USE of "p" and an INDIRECT USE of "*p". Indirect Def follows along the same lines. and CALL is: "fred(a,b,c)" separate nodes are created for "a", "b", and "c" and a CALL node is created for "fred", this represents all global variables as defined and is only needed when IPA is not used. |
| dude_visited | A bit telling whether or not this DUDe was visited. Used only during alias analysis of local dependence graph construction. |
| dude_upward_x_use | A bit telling whether or not this DUDe is upward exposed. |
| dude_downward_x_use | A bit telling whether or not this DUDe is a downward exposed use: is not set for defs. |
| dude_ty_qualifier | The symbol associated with this DUDe is a basic of an access type. ARRAY_TYPE- The symbol associated with this DUDe is an array. STRUCTURE_TYPE- The symbol associated with this DUDe is a structure. OTHER_TYPE - The symbol associated with this DUDe is some other (strange) type. |
| dude_aff_by_call | A bit indicating whether or not this DUDe should be treated as global with respect to CALLs, in other words a CALL can affect it. |
| dude_is_subscripted | A bit indicating that the DUDe has a subscript operator associated with it; different than the ty_qualifier being an array because "C" can have a subscripted pointer. |
| dude_multiple_alias | A bit indicating a multiple alias associated with the DUDe node. |
| dude_parameter | A bit indicating that the DUDe is attached to an actual parameter. |
| dude_vector_mask | Bit mask indicating the loops in which this reference's address varies (i.e. potentially forms a vector of values). |
| dude_pointer | A bit telling whether or not this symbol associated with this DUDe is a pointer. |
| dude_ptr_alias | A bit when set means this DUDe can be an alias for an unresolved pointer reference. |
| dude_bound | If ptr_alias is set, then this is the bound class for the DUDe node. Weakly - This DUDe is a weakly bound type. (e.q. A "C" integer pointer can point to an integer or unsigned integer). Strongly - The DUDe is a strongly bound type. (e.q. A "C" structure pointer can only point to things that are the same structure) |

TABLE X-continued

| DUDe Node Field | DUDe Node Description |
|---|---|
| | Unbound - This DUDe is unbound type (e.g. a "C" void pointer can point to anything it desires) |
| dude_alias_type | If ptr_alias is set, then this is the specific type of thing that it points to, if it is weakly bound it will be a class, if it is strongly bound it will be the node index of the type node that describes it, and if it is unbound it will be zero. |

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

What is claimed is:

1. In a computer processor, a computer implemented method for compiling and optimizing a source code file written in one or more high level programming languages to produce an object code file and an integrated hierarchical representation file (the IHR file) for the source code file associated with the object code, both the object code file and the IHR file to be stored as electronic data files in a memory device, the object code file to be executed on a target computer processing system, the method comprising the steps of:

(a) compiling the source code file by performing the steps of:

(a1) for each high level programming language, generating a HiForm (HF) machine independent representation of the high level program language, the HF representation to be stored as part of the IHR file;

(a2) combining the HF representation for each high level programming language into a single HF representation;

(a3) storing the single HF representation as part of the IHR file;

(a4) generating context information and debug information for the source code file using the single HF representation and the source code file; and (a5) storing the context information and debug information as part of the IHR file;

(b) optimizing the HF representation by performing the steps of:

(b1) in response to a first user-selected option, optimizing the single HF representation to reorganize the single HF representation and generate HF optimization information; and (b2) storing the HF optimization information as part of the IHR file;

(c) translating the HF representation into a LoForm (LF) representation for the target computer processing system by performing the steps of:

(c1) generating a LoForm (LF) machine dependent, hierarchical representation for the HF representation for the target computer processing system; and (c2) storing the LF representation as part of the IHR file;

(d) optimizing the LF representation by performing the steps of:

(d1) in response to a second user-selected option, optimizing the LF representation to reorganize the LF representation and generate LF optimization information; and (d2) storing the LF optimization information as part of the IHR file; and (e) generating the object code file by performing the steps of:

(e1) generating the object code file based upon the LF representation, including generating object code information;

(e2) storing the object code file in the memory device;

(e3) storing the object code information as part of the IHR file; and (e4) storing the IHR file in the memory device, such that the information stored in the IHR file is available during execution of the object code file on the target computer processing system.

2. The method of claim 1 further comprising the steps of:

(f) debugging the object code file by performing the steps of:

(f1) executing the object code file on the target computer processing system;

(f2) accessing the IHR file; and (f3) analysing the information in the stored IHR file to debug the object code file.

3. The method of claim 2 wherein the programming languages include one or more high level language and an assembly language.

4. The method of claim 3 wherein the target computer processing system is a highly parallel multiprocessor system.

5. The method of claim 4 wherein the computer processor for performing steps (a)-(f) and the target computer processing system are comprised of a plurality of computer processors which are networked together.

6. The method of claim 5 wherein the step of debugging the object code file during execution by using the stored IHR file is accomplished in a distributed manner such that a user on one computer processor can debug a source code file executing on another computer processor.

7. In a computer system having a data storage device for storing computer data, wherein data for an integrated hierarchical representation file (IHR file) of a computer program executed on said computer system is stored in a data storage device and implemented on said computer system according to a data structure, said computer system comprising:

one or more computer processors for compiling, optimizing and debugging a source code file for the computer program to produce an object code file to be executed on a target computer processing system, said source code file including a series of high level programming language statements defining operations executed by said target computer processing system;

said data structure for storing data in the data storage device for the IHR tile comprises:

scope node means for storing one or more items of context information which defines one or more scopes within the source code file;

for each scope within the source code file, a plurality of symbol node means, each symbol node means for storing all items of information about a unique named object included in the high level programming language statements of the source code file;

for each scope within the source code file, a plurality of statement node means, each statement node means for storing one or more machine independent, common intermediate statements generated by the computer processor for each of the high level programming language statements included in the source code file; the statement node means being operably linked to one another in a lexical order;

for each statement node means;

one of more expression node means, each expression node means for storing an operator or operand that together with the other expression node means define the operation indicated by the associated statement node means;

literal node means for storing a value for each constant operated on by the operation indicated by the associated statement node means;

type node means for storing a data type for each named object operated on by the operation indicated by the associated statement node means; and LoForm node means for storing one or more machine dependent instruction generated for the target computer processing system for each expression node means;

wherein said computer system access said data structure to retrieve said information for compiling, optimizing and debugging said source code file for the computer program to produce said object code file executed on said target computer processing system.

8. The data structure for storing data in the data storage device of claim 7 further comprising:

for each scope within the source code file, block node means for storing the relationships of one or more basic blocks of statement node means in the source code file;

for each basic block, DUDe node means for storing any data dependences between named objects used within the basic block which are defined as variables in the source code file; and for each scope within the source code file, loop node means for storing the relationships of any loops identified by the statement node means in the source code file, such that the information contained in the block node means, the DUDe node means and the loop node means is generated by the computer processor as a result of optimizing the statement node means.

9. In a computer processor, a computer implemented method for compiling and optimizing a source code file comprising one or more program modules written in one or more programming languages to produce an object code file to be executed on a target computer processing system and an integrated hierarchical representation file (the IHR file) for the source code file associated with the object code, both the object code file and the IHR file to be stored as data files in a memory device, the method comprising the steps of:

(a) compiling each program module by performing for each program module the steps of:

(a1) generating a HiForm (HF) machine and language independent representation of the program module, the HF representation to be stored as part of the IHR file;

(a2) storing the HF representation as part of the IHR file;

(a3) generating context information and debug information for the source code file using the HF representation of the program module; and (a4) storing the context information and debug information as part of the IHR file;

(b) optimizing the HF representation for each program module by performing the steps of:

(b1) in response to a first user-selected option, optimizing the HF representations of the program module to reorganize the HF representation and generate HF optimization information; and (b2) storing HF optimization information as part of the IHR file;

(c) translating the HF representation into a LoForm (LF) representation for the target computer processing system for each program module by performing the steps of:

(c1) generating a LoForm (LF) machine dependent, hierarchical representation for the HF representation of each program module for the target computer processing system; and (c2) storing the LF representation as part of the IHR file;

(d) optimizing the LF representation by performing the steps of:

(d1) in response to a second user-selected option, optimizing the LF representation of the one or more of the program modules to reorganize and generate LF optimization information; and (d2) storing LF optimization information as part of the IHR for the source code file; and (e) generating the object code file of the source code file based upon the LF representation of all of the program modules by performing the steps of:

(e1) generating the object code file based upon the LF representations of all of the program modules, including generating the object code information;

(e2) storing the object code information as part of the IHR file; and (e3) storing the object code file and the IHR file in the memory device, such that the information stored in the IHR file is available during execution of the object code file on the target computer processing system.

10. The method of claim 9 wherein the step (e1) includes the steps of:

(e11) generating a module object code file for each of the program modules; and (e12) linking all of the module object code files into a single object code file.

11. The method of claim 10 wherein both step (c) and step (f2) include the step of inlining procedure calls.

12. The method of claim 9 wherein the IHR file is stored as a graphical structure and steps (c) and (e) include the step of performing graphical reductions on the IHR file.

13. The method of claim 9 wherein the programming languages include one or more high level language and an assembly language.

14. The method of claim 9 wherein the target computer processing system is a highly parallel multiprocessor system.

15. The method of claim 14 wherein the computer processor for performing steps (a)-(g) and the target computer processing system are comprised of a plurality of computer processors which are networked together.

16. In a computer processor, a method for performing source level debugging of an optimized object code file to be executed on a target computer processing system wherein the optimized object code file represents a source code file comprised of one or more program modules written in one or more high level programming languages, the method comprising the steps of:

(a) for each program module, generating a HiForm (HF) machine and language independent representation of the program module, the HF representation to be stored as part of an integrated hierarchical representation file (the IHR file) for the source code file in the form of a set of electronic data files to be stored in the computer processor;

(b) generating context information and debug information for the source code file using the HF representation of the program module and storing the context information and debug information as part of the IHR file;

(c) generating a LoForm (LF) machine dependent, hierarchical representation for the HF representation of each program module and storing the LF representation as part of the IHR file;

(d) generating an object code file based upon the LF representation of the source code file; and (e) using the IHR file to debug the object code file as it is executed on the target computer processing system.

17. A computer implemented method for electronically organizing and storing data for an integrated hierarchical representation file (the IHR file) of a computer program for use with a compilation system having one or more storage mechanisms for storing data and having one or more computer processors for compiling, optimizing and debugging a source code file for the computer program to produce an object code file to be executed on a target computer processing system, the source code file being stored in the storage mechanism for the compilation system and including a series of high level programming language statements defining operations to be executed by the target computer processing system, the method comprising:

(a) identifying, organizing and storing as part of the IHR file one or more items of context information which defines one or more scopes within the source code file; each such item of context information designated as a scope node;

(b) for each scope within the source code file, identifying, organizing and storing as part of the IHR file all items of information about each unique named object included in the high level programming language statements of the source code file, each such item of information designated as a symbol node within each scope node;

(c) for each scope within the source code file, identifying, organizing and storing as part of the IHR file one or more machine independent, common intermediate statements generated by the computer processor for each of the high level programming language statements included in the source code file, each such statement designated as a statement node, the statement nodes being operably linked to one another in a lexical order;

(d) for each statement node;

(d1) identifying, organizing and storing as part of the IHR file an operator or operand that together with the other operators or operands define the operation indicated by the associated statement node, each such operator or operand designated as an expression node;

(d2) identifying, organizing and storing as part of the IHR file a value for each constant operated on by the operation indicated by the associated statement node, each such value designated as a literal node;

(d3) identifying, organizing and storing as part of the IHR file a data type for each named object operated on by the operation indicated by the associated statement node, each such data type designated as a type node; and (e) storing as part of the IHR file one or more machine dependent instruction generated for the target computer processing system for each expression node during the compilation process, each such instruction designated as a LoForm node, such that the information stored in the IHR file is available during execution of the object code file on the target computer processing system.

18. The method of claim 17 further comprising the steps of using the computer processor to perform an optimization on the source code file, the optimization including the steps of:

(f) for each scope within the source code file, identifying, organizing and storing as part of the IHR file the relationships of one or more basic blocks of statement nodes in the source code file; such relationships designated as block nodes;

(g) for each basic block, identifying, organizing and storing as part of the IHR file any data dependences between named objects used within the basic block which are defined as variables in the source code file; such data dependences designated as DUDe nodes; and (h) for each scope within the source code file, identifying, organizing and storing as part of the IHR file the relationships of any loops identified by the statement nodes in the source code file, such relationships designated as loop nodes.

* * * * *

UNITED STATES PATENT AND TRADEMARK OFFICE
CERTIFICATE OF CORRECTION

PATENT NO. : 5,175,856

DATED : December 29, 1992

INVENTOR(S) : Don A. Van Dyke et al.

It is certified that error appears in the above-indentified patent and that said Letters Patent is hereby corrected as shown below:

Column 14, line 62, please delete "variable" and insert --variables-- therefor.

Column 19, lines 22-23, under the 2nd column, please delete "This is the first block symbol node in this scope." and insert --This is the table of macros defined for this scope.-- therefor.

Column 25, line 24, under the 1st column, please delete "sy_target_goto" and insert --sy_target_of_goto-- therefor.

Signed and Sealed this

Thirtieth Day of July, 1996

Attest:

BRUCE LEHMAN

Attesting Officer

Commissioner of Patents and Trademarks